US010415707B2

(12) United States Patent
Bidkar et al.

(10) Patent No.: US 10,415,707 B2
(45) Date of Patent: Sep. 17, 2019

(54) FACE SEAL ASSEMBLY AND AN ASSOCIATED METHOD THEREOF

(71) Applicant: General Electric Company, Schenectady, NY (US)

(72) Inventors: Rahul Anil Bidkar, Niskayuna, NY (US); Azam Mihir Thatte, Kensington, CA (US); Jifeng Wang, Niskayuna, NY (US); Xiaoqing Zheng, Niskayuna, NY (US); Edip Sevincer, Watervliet, NY (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 15/397,317

(22) Filed: Jan. 3, 2017

(65) Prior Publication Data

US 2018/0003069 A1    Jan. 4, 2018

Related U.S. Application Data

(60) Provisional application No. 62/357,097, filed on Jun. 30, 2016.

(51) Int. Cl.
*F16J 15/40* (2006.01)
*F01D 25/22* (2006.01)
*F16J 15/34* (2006.01)

(52) U.S. Cl.
CPC .............. *F16J 15/40* (2013.01); *F01D 25/22* (2013.01); *F16J 15/342* (2013.01); *F05D 2240/53* (2013.01)

(58) Field of Classification Search
CPC .......... F16J 15/40; F16J 15/342; F01D 25/22; F05D 2240/53
See application file for complete search history.

(56) References Cited

U.S. PATENT DOCUMENTS 3,033,577 A    5/1962  Hans
3,556,538 A    1/1971  Muller
(Continued)

FOREIGN PATENT DOCUMENTS

CN    201521433 U    7/2010
WO    1995006211 A1    3/1995

OTHER PUBLICATIONS

Cheng et al., "Behavior of Hydrostatic and Hydrodynamic Noncontacting Face Seals", Journal of Lubrication Technology, vol. 90, Issue 2, Apr. 1, 1968, pp. 510-519.

(Continued)

*Primary Examiner* — Joseph J Dallo
(74) *Attorney, Agent, or Firm* — Ann Agosti

(57) ABSTRACT

A turbomachine and a method of operating the turbomachine are disclosed. The turbomachine includes a stator, a rotor including a rotor bearing face, a face seal assembly, a first pressure cavity, and a second pressure cavity. The face seal assembly includes a seal ring including a seal bearing face, a first pressure cavity, and a plurality of isolated hydrostatic ports extending from the first pressure cavity to the seal bearing face. The face seal assembly is slidably coupled to the stator and defines a face seal clearance between the rotor and seal bearing faces. The second and third pressure cavities are defined by the stator, the rotor, and the face seal assembly. The third pressure cavity is disposed downstream of the second pressure cavity with reference to flow of a process fluid along the stator and rotor. The first pressure cavity is isolated from the second and third pressure cavities.

22 Claims, 14 Drawing Sheets

(56) References Cited

U.S. PATENT DOCUMENTS

| | | |
|---|---|---|
| 3,572,727 A | 3/1971 | Greiner |
| 3,804,424 A | 4/1974 | Gardner |
| 3,926,442 A | 12/1975 | Muller |
| 4,212,475 A | 7/1980 | Sedy |
| 4,523,764 A | 6/1985 | Albers et al. |
| 4,738,453 A | 4/1988 | Ide |
| 4,768,790 A | 9/1988 | Netzel et al. |
| 5,052,694 A | 10/1991 | Lipschitz |
| 5,067,733 A | 11/1991 | Nagai et al. |
| 5,090,712 A | 2/1992 | Pecht et al. |
| 5,143,384 A | 9/1992 | Lipschitz |
| 5,172,918 A | 12/1992 | Pecht et al. |
| 5,180,173 A | 1/1993 | Kimura et al. |
| 5,201,531 A | 4/1993 | Lai |
| 5,222,743 A | 6/1993 | Goldswain et al. |
| 5,224,714 A | 7/1993 | Kimura et al. |
| 5,398,943 A | 3/1995 | Shimizu et al. |
| 5,441,283 A | 8/1995 | Pecht et al. |
| 5,454,572 A | 10/1995 | Pospisil |
| 5,496,047 A | 3/1996 | Goldswain et al. |
| 5,501,470 A | 3/1996 | Fuse et al. |
| 5,531,458 A | 7/1996 | Sedy |
| 5,533,739 A | 7/1996 | Sedy |
| 5,538,649 A | 7/1996 | Demendi et al. |
| 5,560,622 A | 10/1996 | Sedy |
| 5,609,342 A | 3/1997 | Peterson et al. |
| 5,664,787 A | 9/1997 | Fuse et al. |
| 5,681,047 A | 10/1997 | Klostermann et al. |
| 5,700,013 A | 12/1997 | Baty |
| 5,702,110 A | 12/1997 | Sedy |
| 5,722,665 A | 3/1998 | Sedy et al. |
| 6,076,830 A | 6/2000 | Wu et al. |
| 6,131,912 A | 10/2000 | Azibert et al. |
| 6,135,458 A | 10/2000 | Fuse |
| 6,142,478 A | 11/2000 | Pecht et al. |
| 6,145,843 A | 11/2000 | Hwang |
| 6,293,555 B1 | 9/2001 | Sedy |
| 6,299,173 B1 | 10/2001 | Lai |
| 6,322,341 B1* | 11/2001 | Haas ................ F15B 15/12 418/249 |
| 6,446,976 B1 | 9/2002 | Key |
| 6,726,213 B2 | 4/2004 | Wang |
| 7,240,904 B2 | 7/2007 | Droscher et al. |
| 7,377,518 B2 | 5/2008 | Lai |
| 8,100,403 B2 | 1/2012 | Short |
| 8,814,433 B2 | 8/2014 | Tokunaga |
| 9,982,604 B2* | 5/2018 | Miller ................ F02C 7/28 |
| 2007/0007730 A1 | 1/2007 | Garrison et al. |
| 2009/0060408 A1 | 3/2009 | Nagasaka et al. |
| 2014/0086741 A1 | 3/2014 | Ullah |
| 2014/0117625 A1 | 5/2014 | Short et al. |
| 2014/0203517 A1 | 7/2014 | Ferris et al. |
| 2014/0265146 A1 | 9/2014 | Danaher |
| 2015/0132116 A1* | 5/2015 | Zheng ............. F16J 15/3436 415/171.1 |
| 2015/0275684 A1 | 10/2015 | Thatte et al. |
| 2016/0010480 A1 | 1/2016 | Bidkar et al. |
| 2017/0130622 A1* | 5/2017 | Knecht ............. F01L 1/3442 |

OTHER PUBLICATIONS

J F Gardner, "Hydrostatic and hydrodynamic Non-Contacting Face Seals," Triboloy, vol. 3, Issue 2, May 1970, pp. 98-99.

C G Floyd, "Gas seals for rotating shafts", Tribology International, Aug. 1986, vol. 19, Issue 4, pp. 204-211.

Lai T, "Development of non-contacting, non-leaking spiral groove liquid face seals", SciTech Connect, Lubrication Engineering, vol. 50; Issue: 8, Aug. 1994, pp. 625-631.

Jason Marquardt, "Successful Operational Experience Sealing Supercritical CO2," in Supercritical CO2 power cycle symposium, http://www.sco2powercyclesymposium.org/resource_center/turbomachinery/successful-operational-experience-sealing-supercritical-co2, 2011, 35 Pages.

Mayer et al., "Mechanical Seals", Google Books, p. 19 of 290, https://books.google.co.in/books?id=frMgBQAAQBAJ&pg=PA19&lpg=PA19&dq=hybrid+hydrodynamic-hydrostatic+face+seal&source=bl&ots=bbPuzWxSIV&sig=IB9SFLLswsJrPh1K-MnU3ugvBrcU&hl=en&sa=X&ved=0ahUKEwiw9NXZq7nOAhUMpY8KHfq0CT8Q6AEIHTAA#v=onepage&q=hybrid%.

* cited by examiner

FACE SEAL ASSEMBLY AND AN ASSOCIATED METHOD THEREOF

CROSS REFERENCE TO RELATED APPLICATIONS

This patent application claims priority and benefit under 35 U.S.C. § 119(e) from U.S. Provisional Application No. 62/357,097 entitled "SEGMENTED FACE SEAL ASSEMBLY AND AN ASSOCIATED METHOD THEREOF", filed on Jun. 30, 2016, which is incorporated by reference herein in its entirety.

This disclosure was made with Government support under contract number DE-FE0024007 awarded by U.S. Department of Energy. The Government has certain rights in the disclosure.

BACKGROUND

The present disclosure relates generally to a turbomachine, and, more particularly, to a face seal assembly including a plurality of isolated hydrostatic ports and a method of operating such a face seal assembly in the turbomachine.

Turbomachines generally include compressors, turbines, and a rotor, such as, a shaft or a drum, which support turbomachine blades. For example, the turbomachine blades may be arranged in stages along the rotor. The turbomachine may further include various seals to reduce a leakage flow of a process fluid between various components of the turbomachine. For example, the turbomachine may include a face seal assembly configured to reduce the leakage flow of the process fluid from a high-pressure cavity to a low-pressure cavity. Typically, such a face seal assembly may include a sealing ring slidably coupled to the housing and disposed proximate to a rotor. During stationary condition, such as, zero speed or low-speed operating condition, sealing faces of both the sealing ring and the rotor are in contact with each other. While, during normal operating condition, a fluid-film of a pressurized fluid may separate the sealing faces from each other and prevent wear due to friction. The fluid-film may further reduce the leakage flow of the process fluid there between the sealing faces.

The face seal assembly, for example, a hydrodynamic face seal assembly typically operates with a thin fluid-film (i.e., about 2 microns to about 10 microns). The sealing faces for such a face seal assembly needs to have a high degree of flatness, tight assembly tolerance, and small thermal deformation for operating with the thin fluid-film. These requirements of the sealing faces may become further difficult to maintain with increasing diameter of the sealing ring and the rotor. Specifically, the cost of machining the sealing faces of a large diameter (e.g., 0.5 meters or larger) sealing ring and the rotor to a high degree of flatness (e.g., less than 5 microns of the fluid-film thickness) is very high. Further, during start-up condition, the sealing faces may rub against each other resulting in wearing the sealing faces. The sealing faces may further deform/cone either inwardly or outwardly due to thermal loads and/or pressure loads.

The face seal assembly, for example, a radial Rayleigh step hydrostatic face seal assembly typically operate with a fluid-film thickness larger than a fluid-film thickness of a hydrodynamic face seal. Such a face seal assembly may result in changing the fluid-film thickness along the radial direction. However, a fluid-film stiffness and reliable operation of such a face seal assembly depends on the coning deformation of the sealing faces. The face seal assembly, for example, an orifice-compensated hydrostatic face seal assembly has a plurality of orifices for delivering a high-pressure fluid from a high-pressure cavity to the fluid-film to separate the sealing faces and generate a thick fluid-film (i.e., about 25 microns to about 100 microns). However, the orifice-compensated hydrostatic face seal assembly is inherently associated with a lower fluid-film stiffness. The face seal assembly, for example, a barrier fluid hydrostatic face seal assembly is used to inject a barrier fluid using a plurality of pockets along a face seal clearance and prevent a leakage flow of a process fluid. Typically, such a barrier fluid hydrostatic face seal assembly includes a groove, which extends along a circumferential direction of the sealing face and connects the plurality of pockets to each other. However, the groove and the connected pockets reduce the ability of such a face seal assembly to adjust any angular misalignment of the rotor.

Accordingly, there is a need for an enhanced face seal assembly for a turbomachine and an associated method for operating such a face seal assembly to provide a high fluid-film stiffness at a relatively thick fluid-film such that the fluid-film stiffness is less sensitive to rotational speeds, deformations of the sealing faces, and angular misalignments of the rotor.

BRIEF DESCRIPTION

In accordance with one embodiment, a turbomachine is disclosed. In accordance with aspects of the present technique, the turbomachine includes a stator, a rotor including a rotor bearing face, a face seal assembly, a first pressure cavity, and a second pressure cavity. The face seal assembly includes a seal ring including a seal bearing face, a first pressure cavity, and a plurality of isolated hydrostatic ports extending from the first pressure cavity to the seal bearing face. The face seal assembly is slidably coupled to the stator and defines a face seal clearance between the rotor bearing face and the seal bearing face. The second pressure cavity and the third pressure cavity are defined by the stator, the rotor, and the face seal assembly. The third pressure cavity is disposed downstream of the second pressure cavity with reference to a flow of a process fluid along the stator and the rotor. The first pressure cavity is isolated from the second and third pressure cavities.

In accordance with another embodiment, a method of operating a turbomachine is disclosed. In accordance with aspects of the present technique, the method includes injecting a pressurized fluid at a first pressure against a rotor bearing face of a rotor through a plurality of isolated hydrostatic ports of a face seal assembly to generate a fluid-film between the rotor and the face seal assembly. The face seal assembly includes a seal ring including a seal bearing face, a first pressure cavity, and a plurality of isolated hydrostatic ports extending from the first pressure cavity to the seal bearing face. The face seal assembly is slidably coupled to the stator and defines a face seal clearance between the rotor bearing face and the seal bearing face. The method further includes directing a process fluid at a second pressure along the stator and the rotor, and leaking a portion of the process fluid from a second pressure cavity to a third pressure cavity through the face seal clearance. The second and third pressure cavities are defined by the stator, the rotor, and the face seal assembly. The first pressure cavity is isolated from the second and third pressure cavities and the first pressure is greater than the second pressure. The method further includes rotating the rotor for a fluid-film riding operation of the face seal assembly.

DRAWINGS

These and other features and aspects of embodiments of the present technique will become better understood when the following detailed description is read with reference to the accompanying drawings in which like characters represent like parts throughout the drawings, wherein.

DETAILED DESCRIPTION

Figure 1:
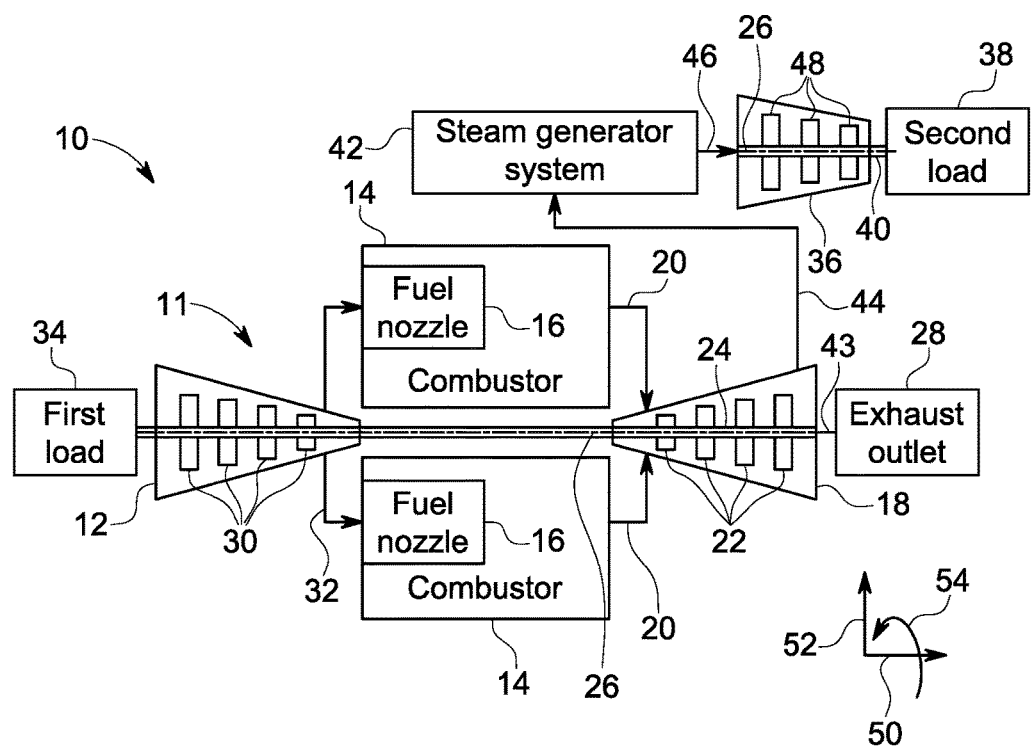
FIG. 1 is a schematic diagram of an embodiment of a combined cycle power generation system having a gas turbine system, a steam generator system, and a steam turbine, in accordance with aspects of the present technique.

Embodiments discussed herein disclose a face seal assembly for a turbomachine, such as, but not limited to, a gas turbine, a steam turbine, a supercritical carbon dioxide turbine, a turbo compressor, and a hydro turbine. In some other embodiments, the face seal assembly may be used in a large-scale $CO_2$ production system, a compressor, an aircraft engine, and the like. In certain embodiments, the turbomachine includes a stator, a rotor, and the face seal assembly disposed between a portion of the stator and the rotor. The rotor includes a rotor bearing face. In one embodiment, the face seal assembly includes a seal ring including a seal bearing face, a first pressure cavity, and a plurality of isolated hydrostatic ports extending from the first pressure cavity to the seal bearing face. The face seal assembly is slidably coupled to the stator and defines a face seal clearance between the rotor bearing face and the seal bearing face. The turbomachine further includes a second pressure cavity and a third pressure cavity defined by the stator, the rotor, and the face seal assembly. The third pressure cavity is disposed downstream of the second pressure cavity with reference to a flow of a process fluid along the stator and the rotor. In one or more embodiments, the first pressure cavity is isolated from the second and third pressure cavities. In certain embodiments, one of the rotor bearing face and the seal bearing face includes a plurality of hydrodynamic elements disposed spaced apart from each other along a circumferential direction of the turbomachine. In some embodiments, the plurality of hydrodynamic elements may include at least one spiral groove or at least one Rayleigh step. The terms "face seal clearance" and "rotor-stator gap" may be used interchangeably.

During operation of the face seal assembly, the rotor may start rotating by a rubbing contact with the seal ring. This may be because at zero speed (i.e., stationary conditions) or low speeds, the rotor may not generate enough separating forces to lift-off the seal bearing face. In such conditions, the plurality of isolated hydrostatic ports may be used to lift-off the seal bearing face. For example, at zero speed condition, the isolated hydrostatic ports may inject the pressurized fluid against the rotor bearing face to generate the separating force which is adequate to lift-off the seal bearing face. Thereby, the pressurized fluid produces a thin fluid-film there between the rotor bearing face and the seal bearing face. The rotor may then spin and the sealing faces of the rotor and the seal ring may not get damaged by start-up rubs. In certain embodiments, one of the rotor bearing face and the seal bearing face includes the plurality of hydrodynamic elements. In such an embodiment, with increasing speed of the rotor, the plurality of hydrodynamic elements may aid the lift-off generated by the isolated hydrostatic ports and produce a relatively thick fluid-film there between the sealing faces. In other words, the rotation of the rotor causes the plurality of hydrodynamic elements to generate an additional separating force to further lift-off the seal bearing face and increase thickness and stiffness of the fluid-film.

The face seal assembly is further configured to reduce leakage of a process fluid from a high-pressure cavity to a low-pressure cavity. In certain embodiments, the high-pressure cavity may be referred as a "seal upstream cavity" and the low-pressure cavity as a "seal downstream cavity". The seal ring of the face seal assembly includes a cavity, which is isolated from the high-pressure and low-pressure cavities. It should be noted herein that the term "isolated" means the cavity is not in fluid communication with a fluid flowing in high-pressure and the low-pressure cavities of the turbomachine, except via fluid flow in the film formed between the seal ring and the rotor. During operation, the cavity is supplied with a pressurized fluid having a pressure that is substantially greater than the pressure of the process fluid around the sealing faces of the face seal assembly. The isolated hydrostatic ports are further configured to inject the pressurized fluid at a pressure greater than the pressure of the process fluid at the seal upstream cavity. Consequently, the isolated hydrostatic ports are subjected to fluid pressure greater than the high-pressure around the seal. This type of pressurization of the face seal assembly results in increased fluid-film stiffness compared to traditional orifice-compensated hydrostatic face seal assembly. It should be noted herein that the term "fluid-film stiffness" is defined as a rate of increase of the separating force with a reduction in the fluid-film thickness. Typically, for optimal operation and dynamic stability of the face seal assembly, it is desirable for the face seal assembly of the present technique to simultaneously possess substantially high fluid-film stiffness and fluid-film thickness.

In certain embodiments, the face seal assembly may include a combination of the isolated hydrostatic ports and the hydrodynamic elements, which allows the face seal assembly to operate at the relatively thick fluid-film, which otherwise is not possible with the traditional face seal assembly operating with only the hydrodynamic elements. In such embodiments, the face seal assembly is configured to provide large fluid-film stiffness and fluid-film thickness due to combined usage of the hydrodynamic elements and the isolated hydrostatic ports. The larger fluid-film stiffness allows for improved dynamic stability of the face seal assembly and the larger fluid-film thickness allows for increased operating margin for face seal assembly tolerances and the sealing faces deformation.

The face seal assembly of the present technique is configured to operate with the seal bearing face and/or the rotor bearing face having a relatively low degree of flatness, thereby reducing the cost of machining sealing faces of the seal ring and the rotor. It should be noted herein that the term "low degree of flatness" may refer to a flatness of the seal bearing face and/or the rotor bearing face in a range from about 3 microns to about 10 microns. Further, the turbomachines may be allowed to use a large diameter seal ring and/or rotor having the low degree of flatness in the face seal assembly. It should be noted herein the term a "large diameter" may refer to the diameter of the seal ring and/or the rotor which is greater than 0.5 meters. The face seal assembly operating with the thick fluid-film may also accommodate the deformation of the seal bearing face and the rotor bearing face that are one order of magnitude smaller than the thickness of the fluid-film.

The face seal assembly of the present technique is further configured to self-adjust during angular misalignments of the rotor. The angular misalignments of the rotor may result in producing uneven fluid-film thickness between the sealing faces along a tangential or circumferential direction. The traditional barrier fluid hydrostatic face seal assembly having a plurality of hydrostatic ports/pockets and a circumferential groove disposed along a sealing face and connecting the plurality of ports/pockets may not be able to react to a differential fluid-film thickness caused by the angular misalignments of the rotor, thereby leading to face seal failures. The isolation of the plurality of hydrostatic ports allows one or more isolated hydrostatic ports at different position to react differently to fluid-film thickness. For example, the one or more isolated hydrostatic ports on a portion of the seal bearing face, approaching closer to the rotor may generate higher pressures (and a higher separating force) and move that portion of the seal ring away from the rotor to ensure that the seal ring does not contact the angularly misaligned rotor.

FIG. 1 is a schematic diagram of an embodiment of a combined cycle system 10 in accordance with one exemplary embodiment of the present technique. The combined cycle system 10 includes various turbomachines in which a face seal assembly (not shown) of the present technique may be used. Specifically, such turbomachines may include the face seal assembly including a seal ring. In certain embodiments, the seal ring includes a seal bearing face, a first pressure cavity, and a plurality of isolated hydrostatic ports extending from the first pressure cavity to the seal bearing face.

As illustrated in the embodiment of FIG. 1, the combined cycle system 10 includes turbomachines, such as, a compressor 12 and a gas turbine 18 of a gas turbine system 11. In such embodiments, the gas turbine system 11 further includes combustors 14 having fuel nozzles 16, coupled to the compressor 12 and the gas turbine 18. In the illustrated embodiment, the compressor 12 includes compressor blades 30 which are coupled to a rotor 24. The compressor blades 30 are driven by the rotor 24 of the gas turbine 18, thereby compressing air to generate a pressurized air 32 and further routing the pressurized air 32 to the combustors 14. In certain embodiments, the compressor 12 may include a face seal assembly (not shown), which is configured to regulate an undesired leakage of the pressurized air 32 across a rotor-stator gap (i.e., a face seal clearance) defined within the compressor 12. The fuel nozzles 16 inject a liquid fuel and/or gas fuel, such as natural gas or syngas, into the combustors 14, where such a fuel is mixed with the pressurized air 32 to generate a fuel-air mixture. The combustors 14 ignite and combust the fuel-air mixture, and then route an exhaust gas 20 to the gas turbine 18 having turbine blades 22, which are coupled to the rotor 24. As illustrated, the rotor 24 is also coupled to the compressor 12. As the exhaust gas 20 flows through the turbine blades 22, the rotor 24 is rotated along a central line axis 26 of the combined cycle system 10. In certain embodiments, the gas turbine 18 may also include the face seal assembly, which is configured to regulate an undesired leakage of the exhaust gas 20 across a face seal clearance (not shown) defined within the gas turbine 18. The rotor 24 is also coupled to a first load 34 to generate power. The first load 34 may include an electrical generator, a propeller of an airplane, and the like.

The combined cycle system 10 further includes turbomachines, such as, a steam turbine 36. In the illustrated embodiment, the gas turbine 18 is coupled to an exhaust outlet 28 and a steam generator system 42 which is coupled to the steam turbine 36. A portion 43 of the exhaust gas 20 exits the gas turbine 18 via the exhaust outlet 28. Another portion 44 of the exhaust gas 20 is transported from the gas turbine 18 to the steam generator system 42 to heat water and produce steam 46. The steam 46 produced by the steam generator system 42 flows through turbine blades 48 of the steam turbine 36. As the steam 46 flow through the turbine blades 48, a rotor 40 is rotated, thereby powering a second load 38, such as, an electrical generator. In certain embodiments, the steam turbine 36 may also include a face seal assembly (not shown), which is configured to regulate an undesired leakage of steam 46 across a face seal clearance defined within the steam turbine 36.

In the following discussion, reference is made to various directions or axes, such as, an axial direction 50 along the central line axis 26, a radial direction 52 away from the central line axis 26, and a circumferential direction 54 around the central line axis 26 of the turbomachines, such as, compressor 12, the gas turbine 18, the steam turbine 36. Additionally, as mentioned above, while the face seal assembly described hereinafter may be used with a variety of other turbomachines (e.g., supercritical $CO_2$ turbines, aircraft engines, and the like) the following discussion describes an enhanced face seal assembly in the context of the steam turbine 36 and such an embodiment should not be construed as a limitation of the present technique.

Figure 2:
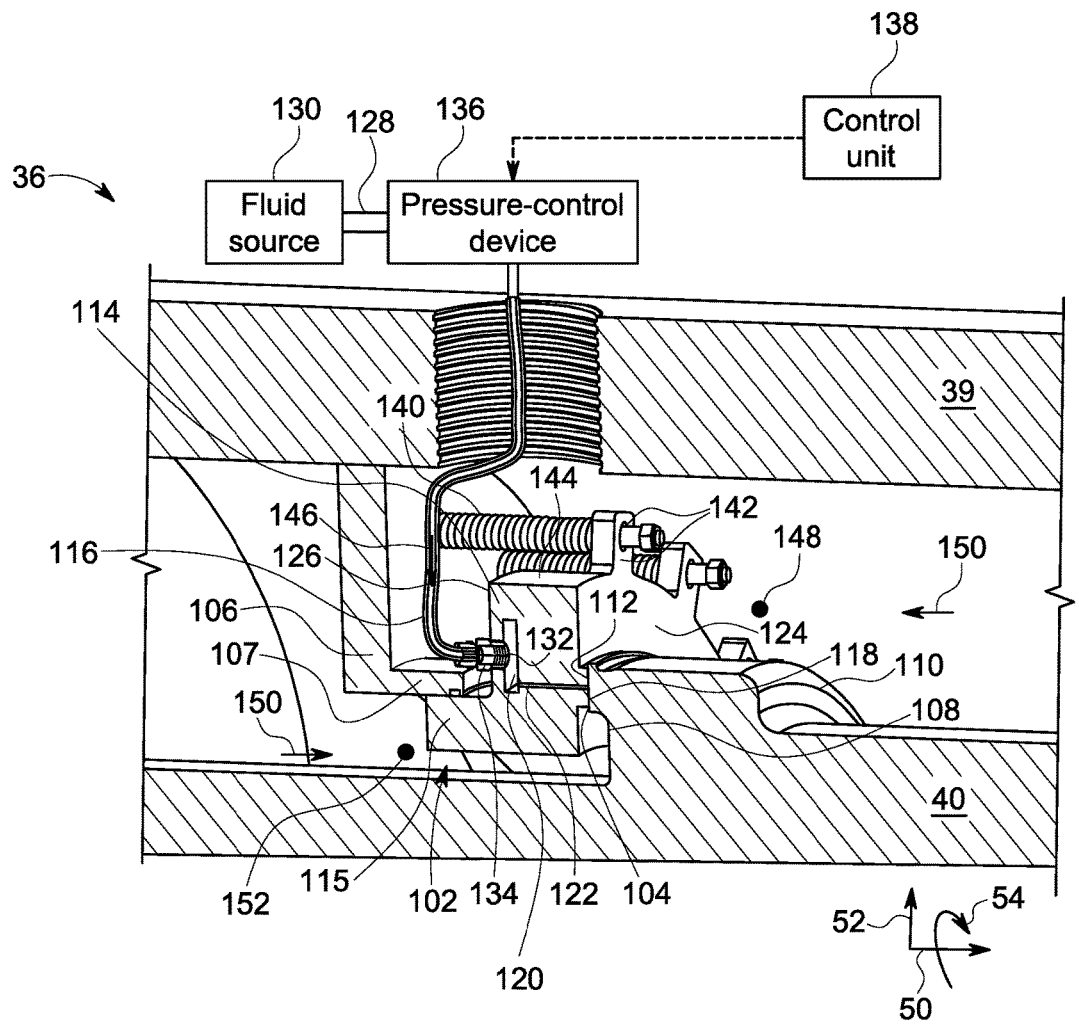
FIG. 2 is a schematic sectional view of a portion of a turbomachine including a stator, a rotor, and a face seal assembly, in accordance with aspects of the present technique.

FIG. 2 shows a schematic sectional view of a portion of a steam turbine 36 in accordance with one exemplary embodiment of the present technique. The steam turbine 36 includes a stator 39, a rotor 40, and a face seal assembly 102. In one embodiment, the stator 39 is a casing of the steam turbine 36 and the rotor 40 is a shaft of the steam turbine 36. The face seal assembly 102 is disposed between the stator 39 and the rotor 40 such that a face seal clearance 104 (hereinafter also referred to as a "primary seal clearance") is established between the face seal assembly 102 and the rotor 40. In one embodiment, the portion corresponds to an end packing area of the steam turbine 36. As used herein, the term "end packing" refers to a downstream end of the rotor 40, where the face seal assembly 102 acts as an interface between the rotor 40 and the stator 39.

The steam turbine 36 further includes a stator adaptor 106 coupled to the stator 39. In certain embodiments, the stator adaptor 106 extends along the circumferential direction 54 of the steam turbine 36. In the illustrated embodiment, the stator adaptor 106 has an L-shaped profile having a projected end portion 107 extending towards the face seal assembly 102. The stator 39 extends along the axial direction 50. The rotor 40 includes an extended section 108 protruding along the radial direction 52 and a rotor ring 110 coupled to an end portion of the extended section 108. In such an embodiment, the rotor ring 110 includes a rotor bearing face 112. In certain embodiments, the rotor 40 includes the rotor bearing face 112 extending circumferentially along the extended section 108.

In the illustrated embodiment, the face seal assembly 102 includes a seal ring 114. The seal ring 114 includes a seal bearing face 118, a first pressure cavity 120, and a plurality of isolated hydrostatic ports 122 (only one isolated hydrostatic port 122 is shown in FIG. 2) extending from the first pressure cavity 120 to the seal bearing face 118. It should be noted herein that FIG. 2 illustrates only a portion of the seal ring 114 and the rotor ring 110. In the illustrated embodiment, the seal ring 114 has an L-shaped profile having a projected end portion 115 extending away from the seal bearing face 118. The seal bearing face 118 is located along a portion of a first peripheral side 124 of the seal ring 114. The first pressure cavity 120 is disposed within the seal ring 114 and located proximate to a second peripheral side 126 of the seal ring 114. The plurality of isolated hydrostatic ports 122 extends from the first pressure cavity 120 to a corresponding opening (not shown) of the isolated hydrostatic port 122 formed on the seal bearing face 118. In some embodiments, one of the seal bearing face 118 and the rotor bearing face 112 may include a plurality of hydrodynamic elements (not shown in FIG. 2) disposed along the circumferential direction 54.

The steam turbine 36 further includes a second pressure cavity 148 having a flow of a process fluid 150 at a high-pressure and a third pressure cavity 152 having a flow of a mixed fluid 154 at a low-pressure. In certain embodiments, the mixed fluid 154 is a mixture of the process fluid 150 and the pressurized fluid 146. The second pressure cavity 148 and the third pressure cavity 152 are defined by the stator 39, the rotor 40, and the face seal assembly 102. It should be noted herein that the second pressure cavity 148 and the third pressure cavity 152 may also be referred to as a "seal upstream cavity" and a "seal downstream cavity" respectively. In certain embodiments, the third pressure cavity 152 is disposed downstream of the second pressure cavity 148 with reference to the flow of the process fluid 150 along the stator 39 and the rotor 40. In such an embodiment, the first pressure cavity 120 is isolated from the second and third pressure cavities 148, 152.

In the illustrated embodiment, the steam turbine 36 further includes a fluid supply tube 116 having a first end 128 coupled to a fluid source 130 and a second end 132 coupled to the first pressure cavity 120 via a tube connector 134. In certain embodiments, the tube connector 134 may be disposed at the second peripheral side 126 of the seal ring 114. In the illustrated embodiment, the fluid source 130 is disposed outside the steam turbine 36 and the fluid supply tube 116 extends through the stator 39. In one embodiment, the fluid source 130 may be storage tank of a pressurized fluid 146, configured to supply the pressurized fluid 146 to the first pressure cavity 120 through the fluid supply tube 116. In one embodiment, the fluid supply tube 116 is a flexible pipe or a flexible conduit. In one embodiment, the pressurized fluid 146 may be air. In some other embodiments, the pressurized fluid 146 may be $CO_2$, nitrogen, steam and the like. In certain embodiments, the fluid supply tube 116 may be coupled to the first pressure cavity 120 and at least one stage of a plurality of stages of the turbomachine, for example, the compressor 12 or the gas turbine 18 (as shown in FIG. 1). In such an embodiment, the at least one stage may be a downstream stage of the compressor 12 or an upstream stage of the gas turbine 18. The at least one stage of the turbomachine may be configured to supply the pressurized fluid 146 (or pressurized exhaust gas) directly to the first pressure cavity 120 through the fluid supply tube 116.

The steam turbine 36 further includes a pressure-control device 136 coupled to the fluid supply tube 116. In the illustrated embodiment, the pressure-control device 136 is disposed outside the steam turbine 36. In one embodiment, the pressure-control device 136 is a fluid pump. In such an embodiment, the fluid pump is configured to increase the pressure of the pressurized fluid 146 before supplying the pressurized fluid 146 to the first pressure cavity 120 through the fluid supply tube 116. In some other embodiment, the pressure-control device 136 is a control valve. The steam turbine 36 further includes a control unit 138 communicatively coupled to the pressure-control device 136. In some embodiments, the control unit 138 may be further coupled to a plurality of sensors (not shown) disposed in the steam turbine 36. In such embodiments, the plurality of sensors may be disposed on the seal ring 114 and/or the rotor ring 110 and configured to sense a pressure of flow of the pressurized fluid 146 and/or a pressure of the process fluid 150 at the face seal clearance 104. The control unit 138 is configured to control the pressure-control device 136 to regulate the pressure of the flow of the pressurized fluid 146 in the plurality of isolated hydrostatic ports 122.

The control unit 138 may be a processor-based device. In some embodiments, the control unit 138 may include a proportional-integral-derivative (PID) controller which may be integrated within a control valve. In some other embodiments, the control unit 138 may be a general purpose processor or an embedded system. The control unit 138 may be operated via an input device or a programmable interface such as a keyboard or a control panel. A memory module of the control unit 138 may be a random access memory (RAM), read only memory (ROM), flash memory, or other type of computer readable memory accessible by the control unit 138. The memory module of the control unit 138 may be encoded with a program for controlling the control valve based on various conditions at which the control valve is defined to be operable.

In one embodiment, the face seal assembly 102 is operatively coupled to the stator 39 via a plurality of biasing members 140 and defines the face seal clearance 104 between the rotor bearing face 112 and the seal bearing face 118. Specifically, the seal ring 114 is slidably coupled to the stator adaptor 106 such that the projected end portion 115 of the seal ring 114 has a sliding interface with the projected end portion 107 of the stator adaptor 106. In certain embodiments, the biasing members 140 is configured to move the face seal assembly 102 along an axial direction 50 of the steam turbine 36. Such an axial movement of the face seal assembly 102 is restricted by a plurality of guide and stop members 142 coupled to an end portion 144 of the seal ring 114, and the plurality of biasing members 140. In the illustrated embodiment, the plurality of biasing members 140 includes helical springs. In certain embodiments, the plurality of biasing members 140 is configured to apply a closing force on the seal ring 114 to move the seal ring 114 along the axial direction 50 and contact the rotor ring 110. In one or more embodiments, the seal bearing face 118 and the rotor bearing face 112 are in contact with each other during a stationary condition of the rotor 40.

The face seal assembly 102 is configured to regulate a leakage flow of the process fluid 150 from the second pressure cavity 148 to the third pressure cavity 152 through the face seal clearance 104, using a fluid film (not shown) formed in the face seal clearance 104. In one embodiment, the process fluid 150 may be steam. In some other embodiments, the process fluid 150 may be $CO_2$ and the like.

Figure 3:
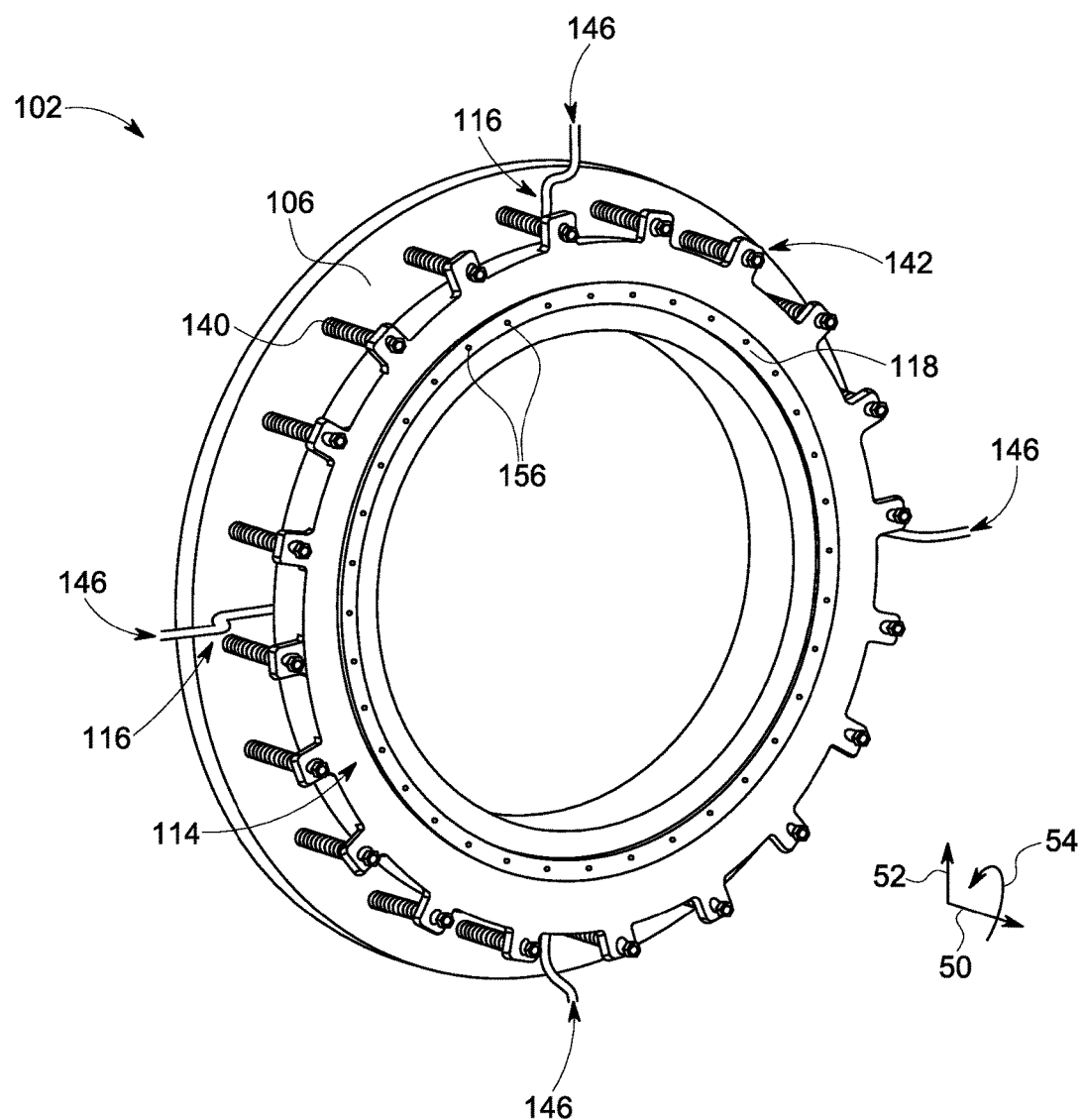
FIG. 3 is a perspective view of a face seal assembly, in accordance with aspects of the present technique.

FIG. 3 shows a perspective view of a face seal assembly 102 coupled to a stator adaptor 106 and a plurality of fluid supply tubes 116 in accordance with one exemplary embodiment of the present technique. In the illustrated embodiment, the face seal assembly 102 includes a seal ring 114. The face seal assembly 102 is coupled to the stator adaptor 106 via a plurality of biasing members 140. The seal ring 114 includes a plurality of openings 156 disposed on the seal bearing face 118 (also referred as a "bearing face"). Each opening of the plurality of openings 156 corresponds to a corresponding isolated port of a plurality of isolated hydrostatic ports 122 (as shown in FIG. 2). The plurality of fluid supply tubes 116 is spaced apart from each other along the circumferential direction 54 and coupled to the plurality of isolated hydrostatic ports 122 via a first pressure cavity 120 (as shown in FIG. 2). In one embodiment, each of the plurality of fluid supply tubes 116 is configured to supply a pressurized fluid 146 to the seal bearing face 118 via the plurality of isolated hydrostatic ports 122.

Figure 4:
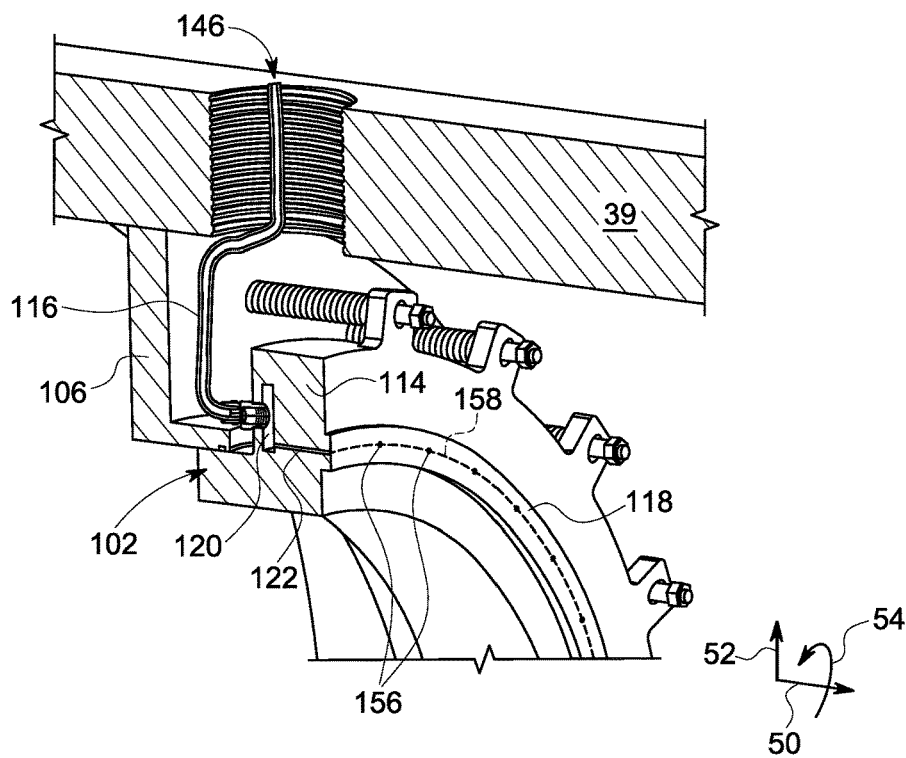
FIG. 4 is a schematic sectional view of a portion of a stator and a face seal assembly having a plurality of isolated hydrostatic ports disposed at a central-line axis of a seal bearing face, in accordance with aspects of the present technique.

FIG. 4 shows a schematic sectional view of a portion of a stator 39 and a face seal assembly 102 in accordance with one exemplary embodiment of the present technique. In one embodiment, the face seal assembly 102 includes a seal ring 114 coupled to a stator adaptor 106 and a fluid supply tube 116. The seal ring 114 includes a seal bearing face 118, a first pressure cavity 120, and a plurality of isolated hydrostatic ports 122 extending from the first pressure cavity 120 to the seal bearing face 118. In one embodiment, the plurality of isolated hydrostatic ports 122 is disposed spaced apart from each along the circumferential direction 54. Further, each isolated port of the plurality of isolated hydrostatic ports 122 includes an opening of a plurality of openings 156 disposed on the seal bearing face 118. In one embodiment, each opening of the plurality of openings 156 is disposed at central-line axis 158 of the seal bearing face 118. Further, the fluid supply tube 116 is coupled to the first pressure cavity 120.

During operation, the fluid supply tube 116 is configured to supply a pressurized fluid 146 to the seal bearing face 118 via the plurality of isolated hydrostatic ports 122. In such an embodiment, the face seal assembly 102 is configured to regulate a pressure of a flow of the pressurized fluid 146 via the plurality of openings 156 disposed at the central-line axis 158 of the seal bearing face 118.

Figure 5:
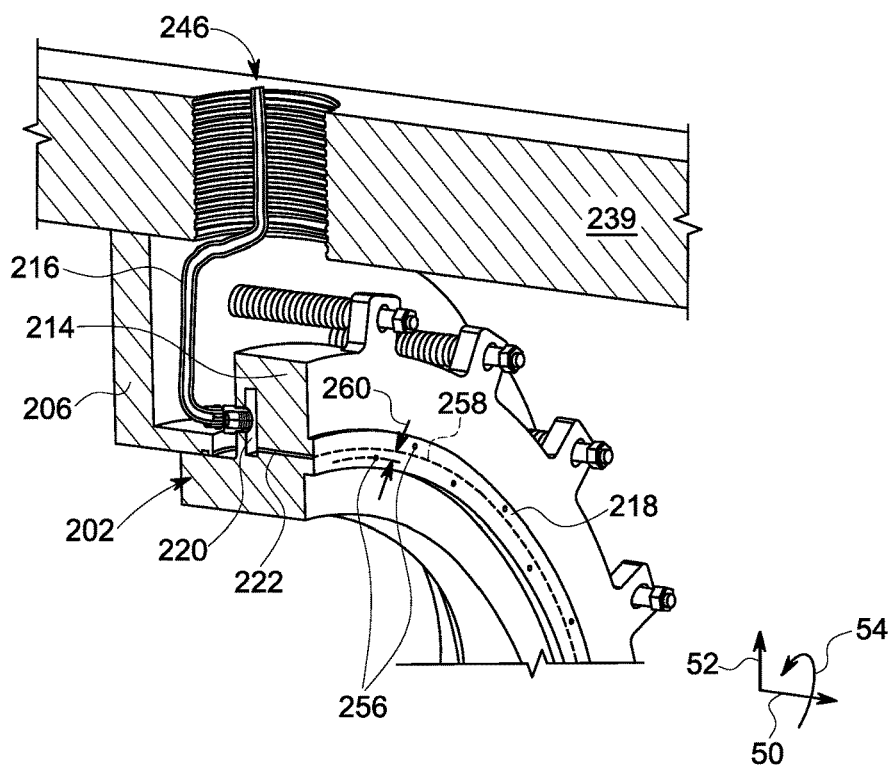
FIG. 5 is a schematic sectional view of a portion of a stator and a face seal assembly having a plurality of isolated hydrostatic ports disposed radially offset from a central-line axis of a seal bearing face, in accordance with aspects of the present technique.

FIG. 5 shows a schematic sectional view of a portion of a stator 239 and a face seal assembly 202 in accordance with another exemplary embodiment of the present technique. In one embodiment, the face seal assembly 202 includes a seal ring 214 coupled to a stator adaptor 206 and a fluid supply tube 216. The seal ring 214 includes a seal bearing face 218, a first pressure cavity 220, and a plurality of isolated hydrostatic ports 222 extending from the first pressure cavity 220 to the seal bearing face 218. In one embodiment, the plurality of isolated hydrostatic ports 222 is disposed spaced apart from each along the circumferential direction 54. Further, each port of the plurality of isolated hydrostatic ports 222 includes an opening of a plurality of openings 256 disposed on the seal bearing face 218. In one embodiment, each isolated port of the plurality of isolated hydrostatic ports 222 is disposed radially offset 260 from a central-line axis 258 of the seal bearing face 218. Further, the fluid supply tube 216 is coupled to the first pressure cavity 220.

During operation of the face seal assembly 202 the fluid supply tube 216 is configured to supply a pressurized fluid 246 to the seal bearing face 218 via the plurality of isolated hydrostatic ports 222. In such an embodiment, the face seal assembly 202 is configured to regulate a pressure of a flow of the pressurized fluid 246 via the plurality of isolated hydrostatic ports 222 disposed radially offset 260 from the central-line axis 258 of the seal bearing face 218.

Figure 6:
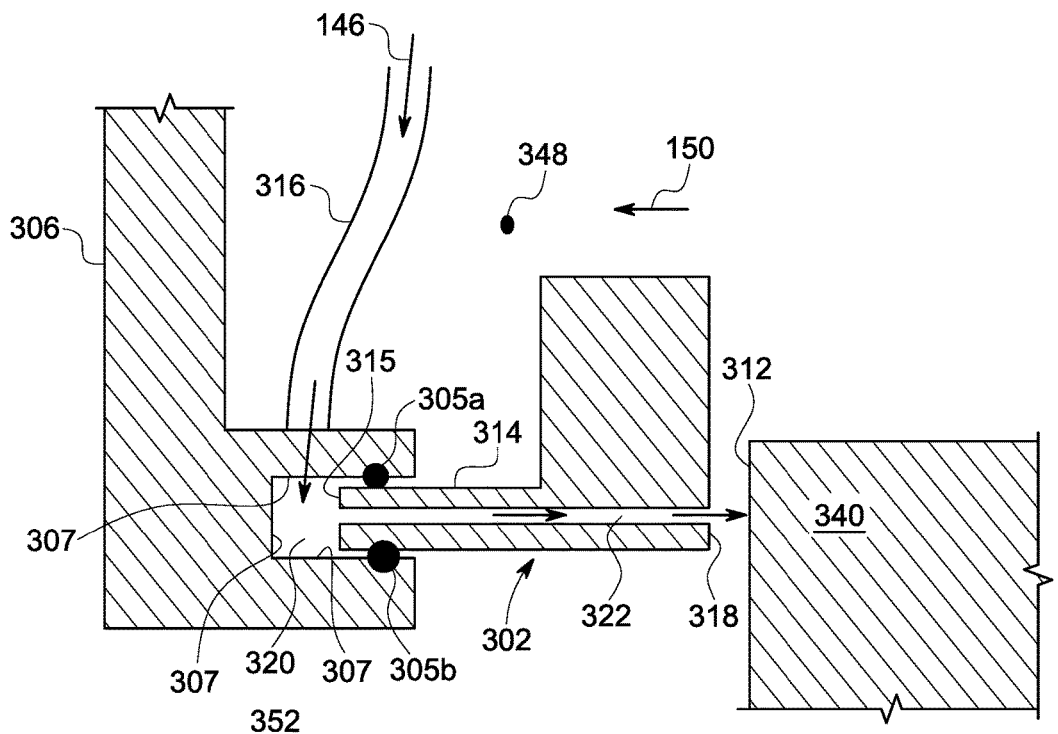
FIG. 6 is a schematic sectional view of a portion of a face seal assembly, a stator adaptor, and a rotor, in accordance with aspects of the present technique.

FIG. 6 shows a schematic sectional view of a portion of a face seal assembly 302, a stator adaptor 306, and a rotor 340 in accordance with yet another exemplary embodiment of the present technique. In one embodiment, the face seal assembly 302 includes a seal ring 314 having a seal bearing face 318, a first pressure cavity 320, and a plurality of isolated hydrostatic ports 322 extending from the first pressure cavity 320 to the seal bearing face 318. It should be noted herein that only one isolated hydrostatic port 322 is shown in FIG. 6. The rotor 340 includes a rotor bearing face 312. In the embodiment illustrated in FIG. 6, the rotor bearing face 312 and the seal bearing face 318 does not include a plurality of hydrodynamic elements. However, in certain embodiments, one of the rotor bearing face 312 and the seal bearing face 318 may include the plurality of hydrodynamic elements. In the illustrated embodiment, the first pressure cavity 320 is formed between a first radial surface 315 of the seal ring 314, three surfaces 307 of the stator adaptor 306, and two secondary seals 305a, 305b. The first pressure cavity 320 is connected to a fluid supply tube 316 and is configured to receive a pressurized fluid 146 through the fluid supply tube 316. Further, the first pressure cavity 320 is configured to supply the pressurized fluid 146 to the plurality of isolated hydrostatic ports 322. In such an embodiment, the secondary seal 305a is configured to prevent the leakage of the pressurized fluid 146 from the first pressure cavity 320 to a second pressure cavity 348. Further, the secondary seal 305b is configured to prevent the leakage of the pressurized fluid 146 from the first pressure cavity 320 to the third pressure cavity 352.

Figure 7:
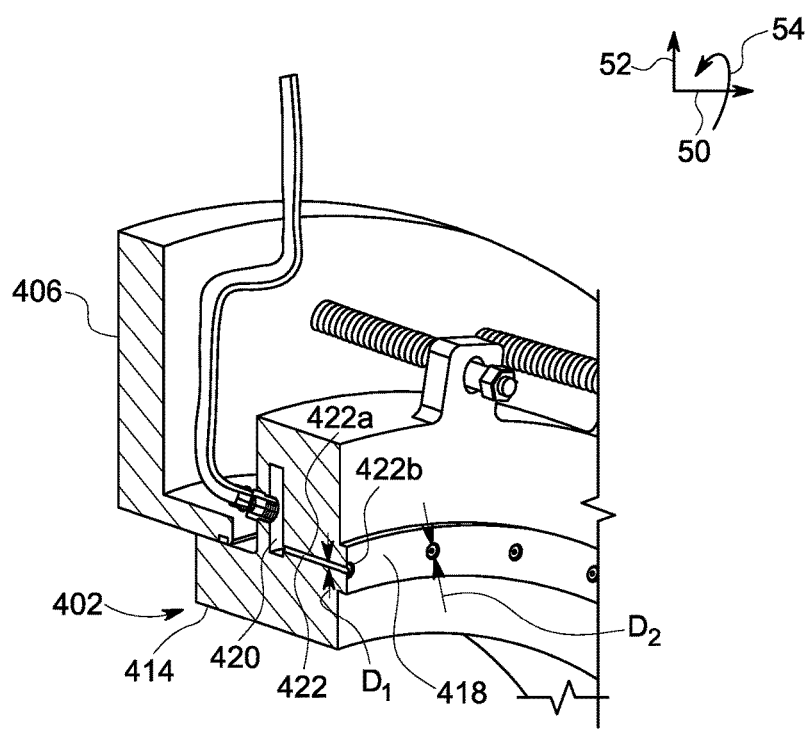
FIG. 7 is a schematic sectional view of a portion of face seal assembly and a stator adaptor, in accordance with aspects of the present technique.

FIG. 7 shows a schematic sectional view of a portion of face seal assembly 402 and a stator adaptor 406 in accordance with one exemplary embodiment of the present technique. In one embodiment, the face seal assembly 402 includes a seal ring 414 including a seal bearing face 418, a first pressure cavity 420, and a plurality of isolated hydrostatic ports 422 extending from the first pressure cavity 420 to the seal bearing face 418. In the illustrated embodiment, each isolated hydrostatic port 422 includes a first portion 422a and a second portion 422b. The first portion 422a is disposed within the seal ring 414 and the second portion 422b is disposed on the seal bearing face 418. It should be noted herein that the second portion 422b may also be referred to as a "counter bore". The first portion 422a has a first diameter "$D_1$" and the second portion 422b has a second diameter "$D_2$" different from the first diameter "$D_1$". The second portion 422b forms a shallow volume on the seal bearing face 418, where the first portion 422a meets the seal bearing face 418. The purpose of the second portion 422b is to enhance the fluid-film stiffness. In the illustrated embodiment, the first and second portions 422a, 422b are shown to have circular profile. In some other embodiments, each first and second portions 422a, 422b may have non-circular shapes. For example, the second portion 422b may have a square-shaped profile depending on the application and design criteria. Further, in the illustrated embodiment, the first portion 422a is shown to be a straight cylindrical port extending along an axial direction 50. In certain other embodiments, the first portion 422a may be slanted relative to the axial direction 50 or extend tortuously from the first pressure cavity 420 to the seal bearing face 418. In other words, the first portion 422a of each isolated hydrostatic port 422 may have a non-straight profile. In the illustrated embodiment, the seal bearing face 418 does not include a plurality of hydrodynamic elements. However, in certain embodiments, the seal bearing face 418 may include the plurality of hydrodynamic elements.

Figure 8:
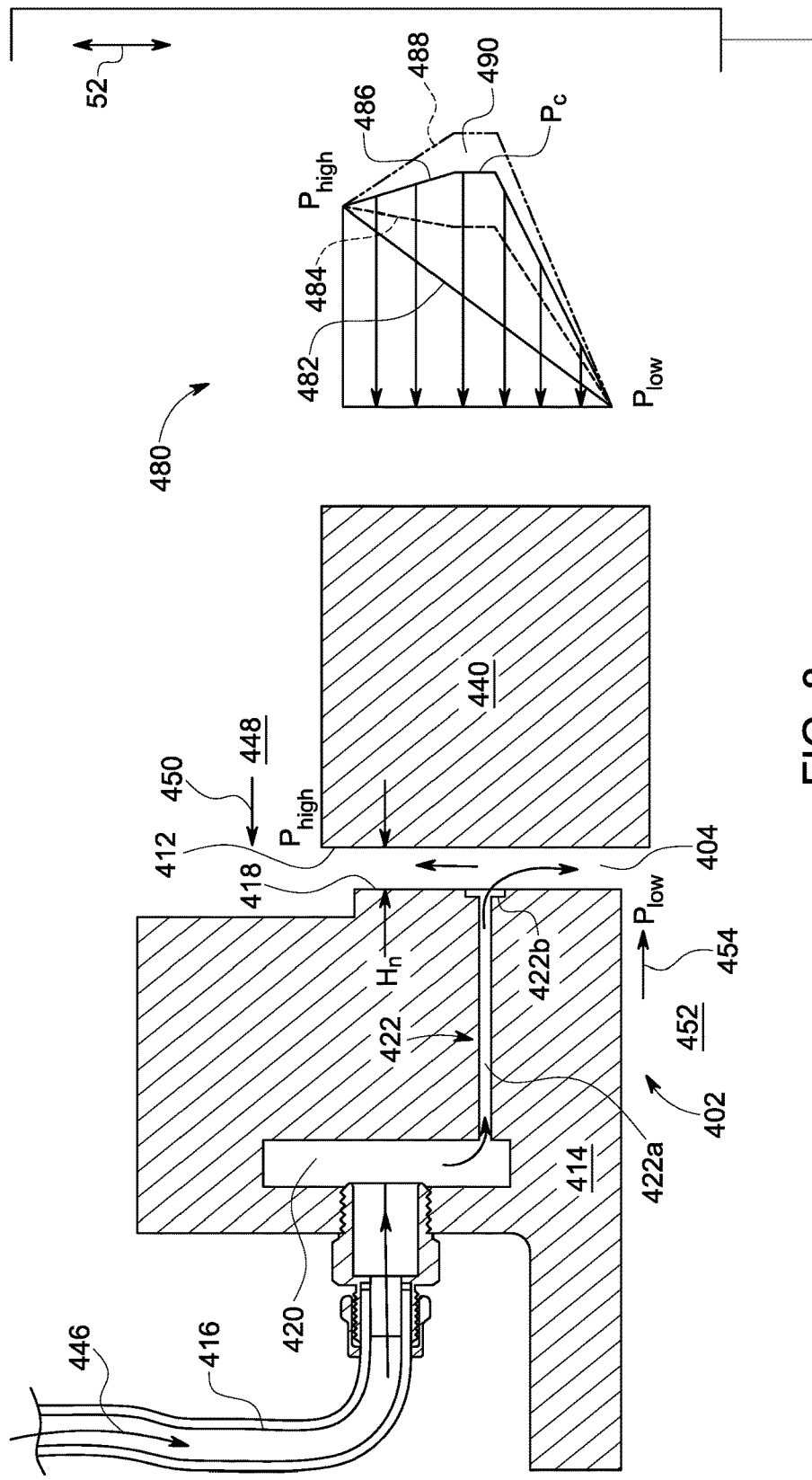
FIG. 8 is a schematic sectional view of the face seal assembly of FIG. 7, a rotor, and a graph illustrating pressure profiles generated along a radial direction, by using such a face seal assembly, in accordance with aspects of the present technique.

FIG. 8 shows a schematic sectional view of the face seal assembly 402 of FIG. 7, a rotor 440, and a graph 480 illustrating pressure profiles 482, 484, 486, 488 generated along a radial direction 52 using the face seal assembly 402 in accordance with one exemplary embodiment of the present technique. In one embodiment, the rotor 440 includes a rotor bearing face 412. In the illustrated embodiment, the rotor bearing face 412 does not include the plurality of hydrodynamic elements. However, in certain embodiments, the rotor bearing face 412 may include the plurality of hydrodynamic elements. The face seal assembly 402 is shown to be separated with a fluid-film having a nominal thickness "$H_n$". Note that the fluid-film thickness "$H_n$" is shown exaggeratedly in FIG. 8 and not to scale with geometries of the seal ring 414 and the rotor 440. The pressure profiles 482, 484, 486, 488 are generated locally using the first portion 422a and the second portion 422b (i.e., counter bore) of the isolated hydrostatic port 422. Further, during operation, the first pressure cavity 420 is supplied with a pressurized fluid 446 having a first pressure "$P_{supply}$" which is greater than a second pressure "$P_{high}$" of a process fluid 450 which flows along a second pressure cavity 448. A third pressure cavity 452 is supplied with a mixed fluid 454 (i.e., the mixture of pressurized fluid 446 and the process fluid 450) having a third pressure "$P_{low}$", which is less than the first pressure "$P_{supply}$" and the second pressure "$P_{high}$".

The pressure profile 482 represents change in pressure value of the process fluid 450 from "$P_{high}$" to "$P_{low}$" from second pressure cavity 448 to the third pressure cavity 452 through the face seal clearance 404. The pressure profile 486 represents the pressure value when a thickness of the fluid-film "H" is equal to a nominal thickness "$H_n$" of a fluid-film (i.e., "H"="$H_n$"). Specifically, the pressure profile 486 increases from "$P_{high}$" to "$P_c$", and gradually reduces from "$P_c$" to "$P_{low}$". The pressure value "$P_c$" represents a local pressure in a counterbore, and depends on both the magnitude of the supply pressure "$P_{supply}$" and the nominal film thickness "$H_n$". Furthermore, a larger "$P_{supply}$" results in a larger "$P_c$" and a smaller "$H_n$" results in a larger "$P_c$".

The pressure profile 484 represents the pressure value when the thickness of a fluid-film "H" is greater than the nominal thickness "$H_n$" of the fluid-film (i.e., "H">"$H_n$"). Similarly, the pressure profile 488 represents the pressure value when the thickness of a fluid-film "H" is less than the nominal thickness "$H_n$" of the fluid-film (i.e., "H"<"$H_n$"). Thus, the presence of isolated hydrostatic port 422a and counterbore 422b result in a change in the pressure profile from 486 to 484, or 486 to 488 respectively depending on whether the fluid-film increases or decreases in thickness. It may be noted that an area 490 between the pressure profiles 486, 488 signifies the difference in the separating force. This area 490 is configured to be significantly large by setting "$P_{supply}$" larger than "$P_{high}$", which implies that the face seal assembly 402 of the present technique is configured to change the pressure value more significantly with the fluid-film thickness than that of a traditional orifice-compensated face seal assembly, thereby improving the fluid-film stiffness. The larger fluid-film stiffness is obtained by maintaining the "$P_{supply}$" greater than that of "$P_{high}$" and by optimizing the diameter of first and second portions 422a, 422b of the isolated hydrostatic port 422. The increased fluid-film stiffness enables to overcome a low fluid-film stiffness drawback of the traditional orifice-compensated face seal assembly. Further, the face seal assembly 402 operates in a self-regulating mode i.e., adjusts the fluid-film thickness "H" by itself to compensate for any unexpected changes in a closing force or unexpected axial movement of the rotor 440.

Figure 9:
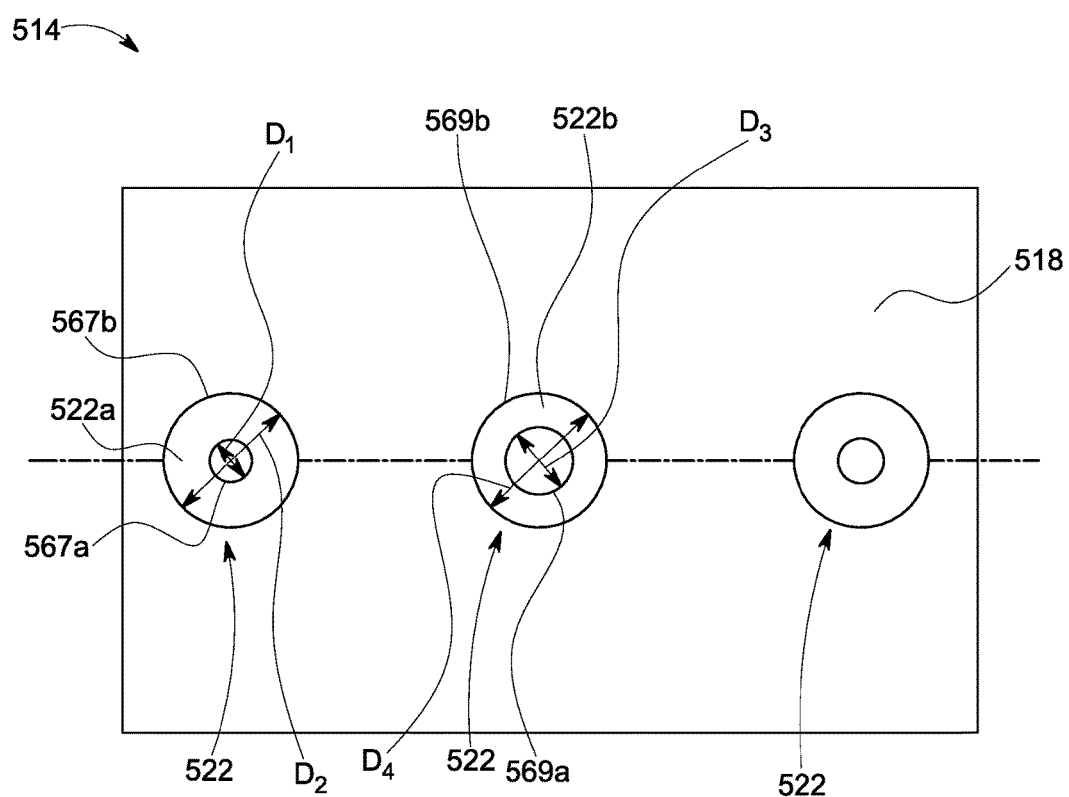
FIG. 9 is a schematic view of a portion of a seal ring, in accordance with aspects of the present technique.

FIG. 9 is a schematic view of a seal bearing face 518 in accordance with another exemplary embodiment of the present technique. In one embodiment, the seal ring 514 of the face seal assembly, includes a plurality of isolated hydrostatic ports 522. In the illustrated embodiment, a first isolated hydrostatic port 522a of the plurality of isolated hydrostatic ports 522 has a first portion 567a having a first diameter "$D_1$" and a second portion 567b having a second diameter "$D_2$" different from the first diameter "$D_1$". Similarly, a second isolated hydrostatic port 522b of the plurality of isolated hydrostatic ports 522 has a first portion 569a having a first diameter "$D_3$" and a second portion 569b having a second diameter "$D_4$" different from the first diameter "$D_3$". It should be noted herein that the each of the second portions 567b, 569b may also be referred to as a "counter bore". In one embodiment, each of the second portions 567b, 569b is disposed on the seal bearing face 518 and around a corresponding first portion 567*a*, 569*a* of the plurality of isolated hydrostatic ports 522. Further, each of the second portions 567*b*, 569*b* is in a fluid communication with a corresponding first portion 567*a*, 569*a*. The second portions 567*b*, 569*b* may be configured to create pressurized pockets on the seal bearing face 518 and a rotor bearing face to improve a load-bearing capacity of the face seal assembly. In the illustrated embodiment, the plurality of isolated hydrostatic ports 522 has a different dimension. In the illustrated embodiment, a first diameter "$D_1$" of the first portion 567*a* of the isolated hydrostatic port 522*a* is different from the first diameter "$D_3$" of the first portion 569*a* of the adjacent isolated hydrostatic port 522*b*. Further, the second diameter "$D_2$" of the second portion 567*b* of the isolated hydrostatic port 522*a* is substantially same as that of the fourth diameter "$D_4$" of the second portion 569*b* of the adjacent isolated hydrostatic port 522*b*. For example, in the illustrated embodiment, each isolated hydrostatic port of the plurality of isolated hydrostatic ports 522 has a circular profile. In certain other embodiments, each of the plurality of isolated hydrostatic ports 522 has an ellipse profile or a rectangular or square profile depending on the application and design criteria.

During operation of the face seal assembly, the fluid supply tube is configured to supply a pressurized fluid to the seal bearing face 518 via the plurality of isolated hydrostatic ports 522. In such embodiments, the face seal assembly is configured to regulate a pressure of flow of the pressurized fluid through the first portions 567*a*, 569*a*. Further, the counter bores 567*b*, 569*b* are used to increase the thickness and stiffness of the fluid-film.

Figure 10A:
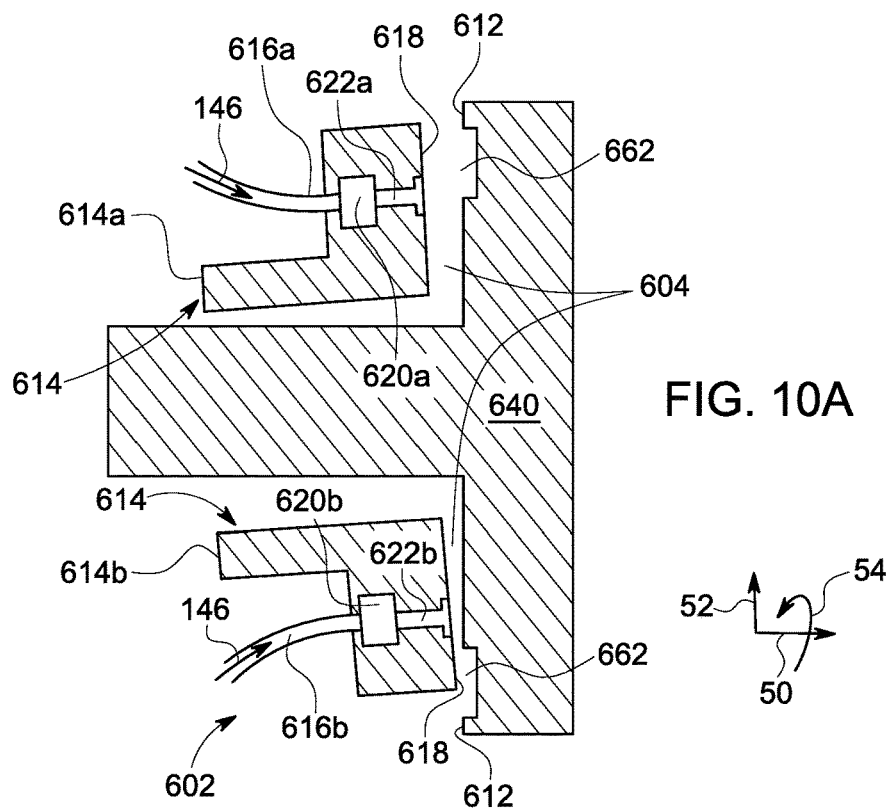
FIG. 10A is a schematic sectional view of a portion of a face seal assembly and a rotor, in accordance with aspects of the present technique.

FIG. 10A shows a schematic sectional view of a portion of a face seal assembly 602 and a rotor 640 in accordance with another exemplary embodiment of the present technique. In one embodiment, the face seal assembly 602 includes a seal ring 614 disposed proximate to the rotor 640 and coupled to a stator (not shown) to define a face seal clearance 604 between the rotor bearing face 612 and the seal bearing face 618. In the illustrated embodiment, the seal ring 614 is a segmented seal ring having a first segment 614*a* and a second segment 614*b*. In certain embodiments, segments 614*a* and 614*b* may be the upper and lower halves of a single continuous seal ring 614. The following discussion, although described in the context of a segmented ring, it is equally applicable for the single continuous seal ring 614, where the first segment 614*a* may correspond to upper half 614*a* and the second segment 614*b* may correspond to lower half 614*b*. The first segment 614*a* includes a first pressure cavity 620*a* and an isolated hydrostatic port 622*a*. The first pressure cavity 620*a* is coupled to a first supply pressure tube 616*a*. The second segment 614*b* includes a first pressure cavity 620*b* and an isolated hydrostatic port 622*b*. The first pressure cavity 620*b* is coupled to a second supply pressure tube 616*b*. In some embodiments, the first pressure cavity 620*a* and the first pressure cavity 620*b* are combined to form a single first pressure cavity 620. In the illustrated embodiment, the rotor bearing face 612 includes a plurality of hydrodynamic elements 662 spaced apart from each other and disposed along a circumferential direction 54 of a turbomachine. In some embodiments, the rotor bearing face 612 may not include the plurality of hydrodynamic elements 662.

In one embodiment, the first and second supply pressure tubes 616*a*, 616*b* are configured to supply the pressurized fluid 146 at a first pressure to the first pressure cavities 620*a*, 620*b* respectively. Each of the first pressure cavities 620*a*, 620*b* is configured to inject the pressurized fluid 146 against the rotor bearing face 612 via the respective isolated hydrostatic port 622*a*, 622*b*. A portion of the rotor bearing face 612 is disposed proximate to the seal bearing face 618 corresponding to the second segment 614*b* due to relative angular misalignment between the rotor 640 and the seal ring 614. Such a misalignment of the rotor 640 and the seal ring 614 reduces the fluid-film thickness at the second segment 614*b*. In such an embodiment, the proximity of the second segment 614*b* generates a higher pressure on the sealing face, thereby generating a higher separating force between the rotor bearing face 612 and the seal bearing face 618 of the second segment 614*b* than the pressure on the seal bearing face 618 of the first segment 614*a*. Thus, the face seal assembly 602 may provide a corrective angular movement for the seal ring 614 to reduce the angular misalignment of the seal ring 614 with the rotor 640. Thus, the present invention has improved misalignment tolerance compared to barrier hydrostatic face seal assembly. The isolation of the isolated hydrostatic ports 622 allows the first and second isolated hydrostatic ports 622*a*, 622*b* to react differently to the fluid-film thickness to ensure that the seal ring 614 does not contact the angularly misaligned rotor 640.

Figure 10B:
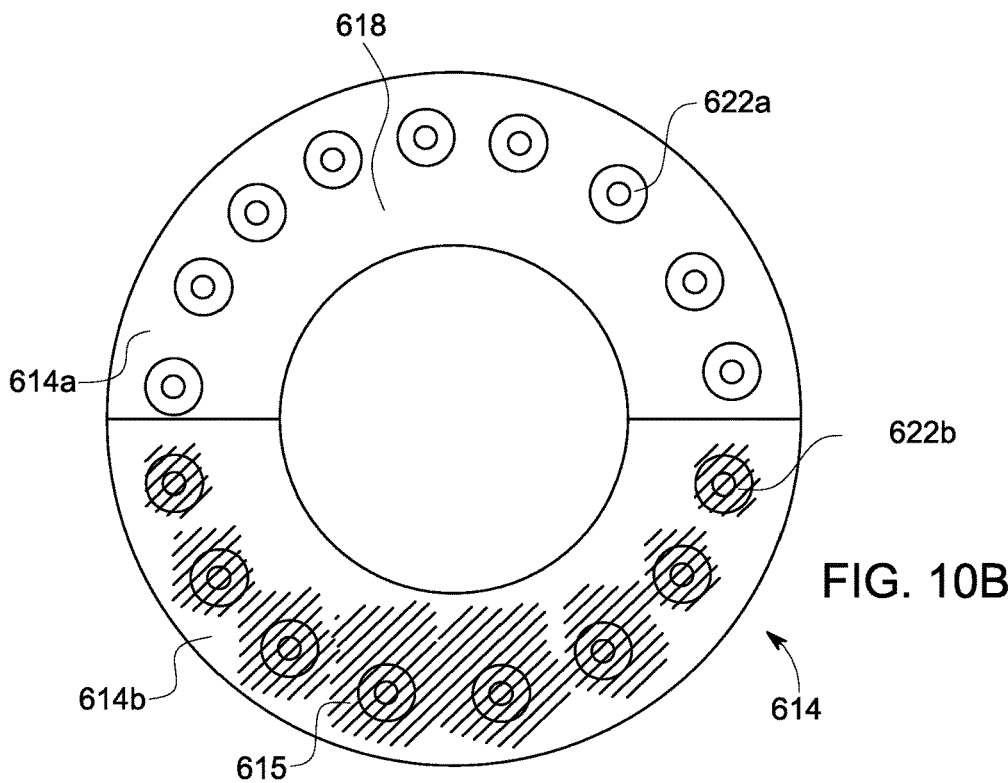
FIG. 10B is a schematic view of a seal ring of the face seal assembly of FIG. 10A, in accordance with aspects of the present technique.

FIG. 10B is a schematic front view of a portion of a seal ring 614 of the face seal assembly of FIG. 10A in accordance with one exemplary embodiment of the present technique. In the illustrated embodiment, the seal bearing face 618 corresponding to the second segment 614*b* of the seal ring 614 experiences more separating force 615 due to the misalignment of the rotor, thereby preventing the seal ring 614 to contact the angularly misaligned rotor.

Figure 11:
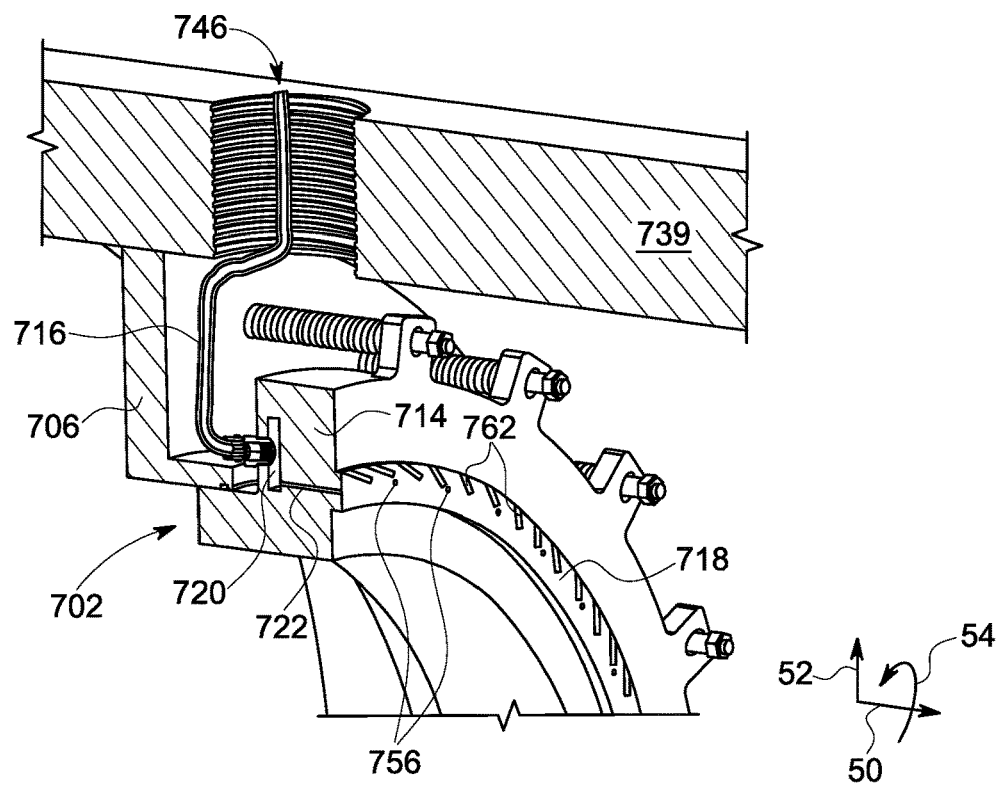
FIG. 11 is a schematic sectional view of a portion of a stator and a face seal assembly having a plurality of hydrodynamic elements and a plurality of isolated hydrostatic ports, in accordance with aspects of the present technique.

FIG. 11 shows a perspective view of a portion of a stator 739 and a face seal assembly 702 in accordance with one exemplary embodiment of the present technique. In one embodiment, the face seal assembly 702 includes a seal ring 714 coupled to a stator adaptor 706 and a fluid supply tube 716. The seal ring 714 includes a seal bearing face 718, a first pressure cavity 720, and a plurality of isolated hydrostatic ports 722 extending from the first pressure cavity 720 to the seal bearing face 718. In one embodiment, the plurality of isolated hydrostatic ports 722 is disposed spaced apart from each along the circumferential direction 54. Each isolated port of the plurality of isolated hydrostatic ports 722 includes an opening of a plurality of openings 756 disposed on the seal bearing face 718. Further, the seal ring 714 includes a plurality of hydrodynamic elements 762 disposed spaced apart from each other along the circumferential direction 54. In the illustrated embodiment, the plurality of hydrodynamic elements 762 is disposed above the plurality of openings 756. In one embodiment, the plurality of hydrodynamic elements 762 includes spiral grooves. The fluid supply tube 716 is coupled to the first pressure cavity 720. During operation, the plurality of isolated hydrostatic ports 722 and the plurality of hydrodynamic elements 762 are configured to a produce a fluid-film between a rotor bearing face (not shown in FIG. 11) and the seal bearing face 718, having a substantially larger thickness compared to traditional hydrodynamic face seal having only a plurality of hydrodynamic grooves.

Figure 12:
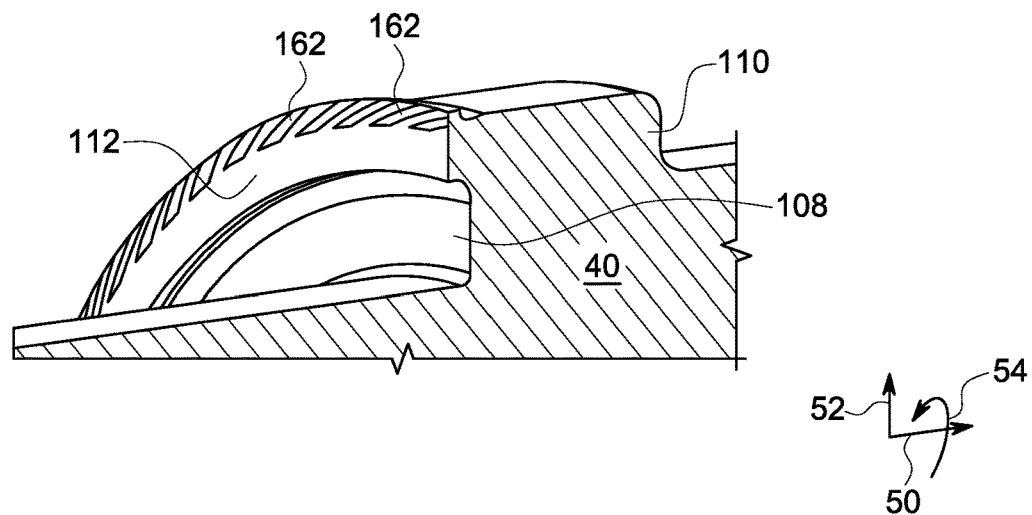
FIG. 12 is a schematic sectional view of a rotor having a plurality of hydrodynamic grooves, in accordance with aspects of the present technique.

FIG. 12 shows a perspective view of a rotor 40 in accordance with one exemplary embodiment of the present technique. The rotor 40 includes an extended section 108 protruding along a radial direction 52 and a rotor ring 110 coupled to an end portion of the extended section 108. In such an embodiment, the rotor ring 110 includes a rotor bearing face 112. In one embodiment, the rotor bearing face 112 includes a plurality of hydrodynamic elements 162 disposed spaced apart from each other along a circumferential direction 54. In the illustrated embodiment, the plurality of hydrodynamic elements 162 includes spiral grooves. In one or more embodiments, upon rotation of the rotor 40, the plurality of hydrodynamic elements 162 is configured to a produce a fluid-film between the rotor bearing face 112 and a seal bearing face 118 (as shown in FIG. 2) or increase thickness and stiffness of the fluid-film.

Figure 13:
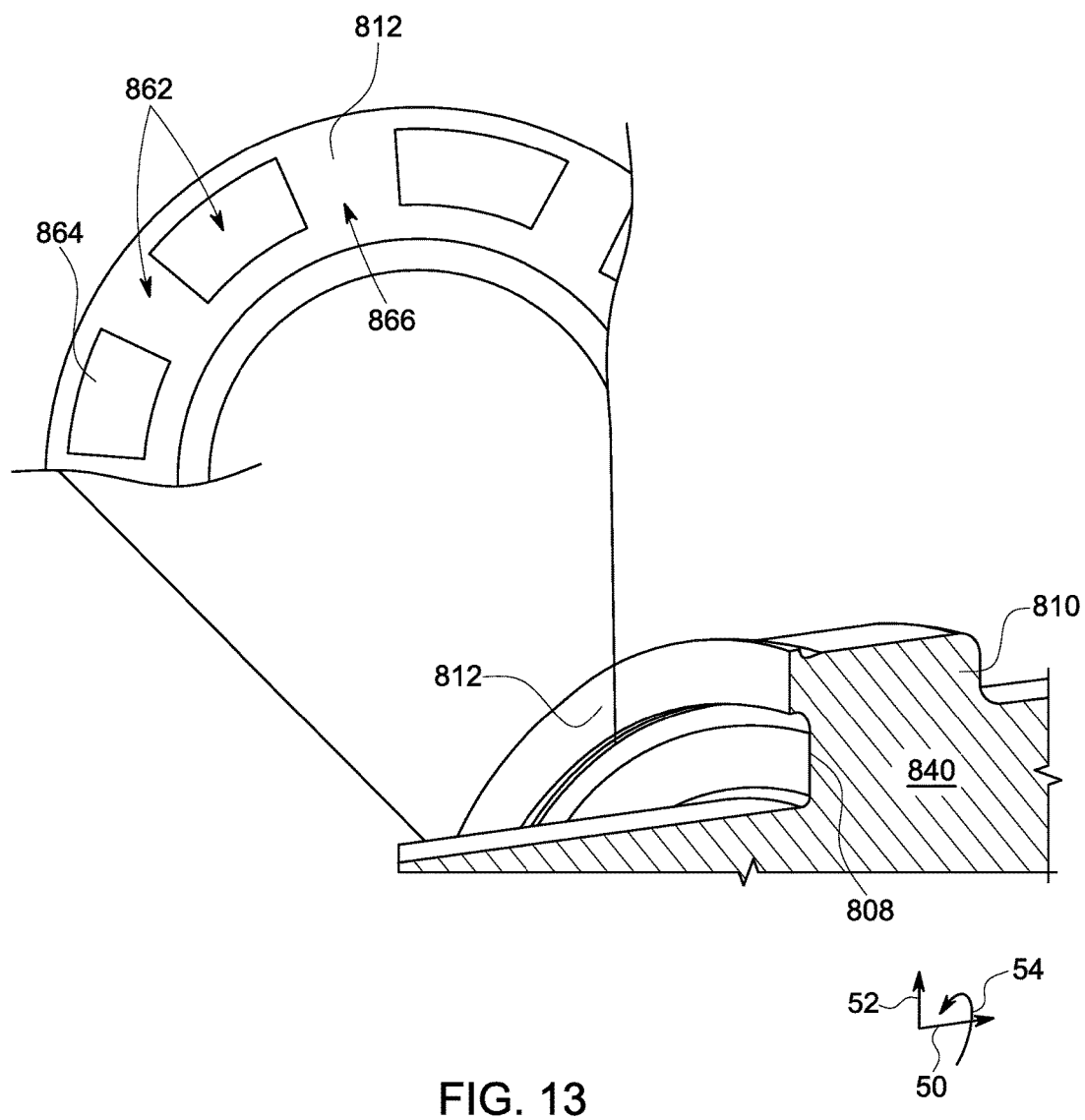
FIG. 13 is a schematic sectional view of a rotor having a plurality of Rayleigh steps, in accordance with aspects of the present technique.

FIG. 13 shows a schematic view of a rotor 840 in accordance with one exemplary embodiment of the present technique. The rotor 840 includes an extended section 808 protruding along a radial direction 52 and a rotor ring 810 coupled to an end portion of the extended section 808. In such embodiments, the rotor ring 810 includes a rotor bearing face 812. In one embodiment, the rotor bearing face 812 includes a plurality of hydrodynamic elements 862 disposed spaced apart from each other along a circumferential direction 54. In the illustrated embodiment, the plurality of hydrodynamic elements 862 includes Rayleigh steps, which are located on a radially outer half of the rotor bearing face 812. In the illustrated embodiment, each hydrodynamic element 862 includes a shallow pocket 864 and a plurality of land portions 866, which are circumferentially spaced apart from each other. In one or more embodiments, upon rotation of the rotor 840, the shallow pocket 864 and the plurality of land portions 866 of the hydrodynamic element 862 are configured to a produce a fluid-film between the rotor bearing face 812 and a seal bearing face (not shown in FIG. 13) or increase thickness and stiffness of the fluid-film.

Referring generically to the embodiments of FIGS. 11-13, in certain other embodiments, the plurality of hydrodynamic elements 862 may be located along a radial centerline or a radially inner half of the rotor bearing face 812. In one or more embodiments, the plurality of hydrodynamic elements 862 located on the radially inner half of the rotor bearing face 812 are especially advantageous because the pumping action caused by the plurality of hydrodynamic elements 862 may further increase the resistance for a process fluid to leak from a seal upstream cavity to the seal downstream cavity via a face seal clearance. In certain embodiments, a flow of a pressurized fluid through a plurality of the isolated hydrostatic ports may either flow to the seal downstream cavity (i.e., radially inwards) or the seal upstream cavity (i.e., radially outwards). It might be advantageous from a turbomachine efficiency to direct most of the flow from the plurality of isolated hydrostatic ports to flow to the seal upstream cavity with very little flow to the seal downstream cavity.

Figure 14:
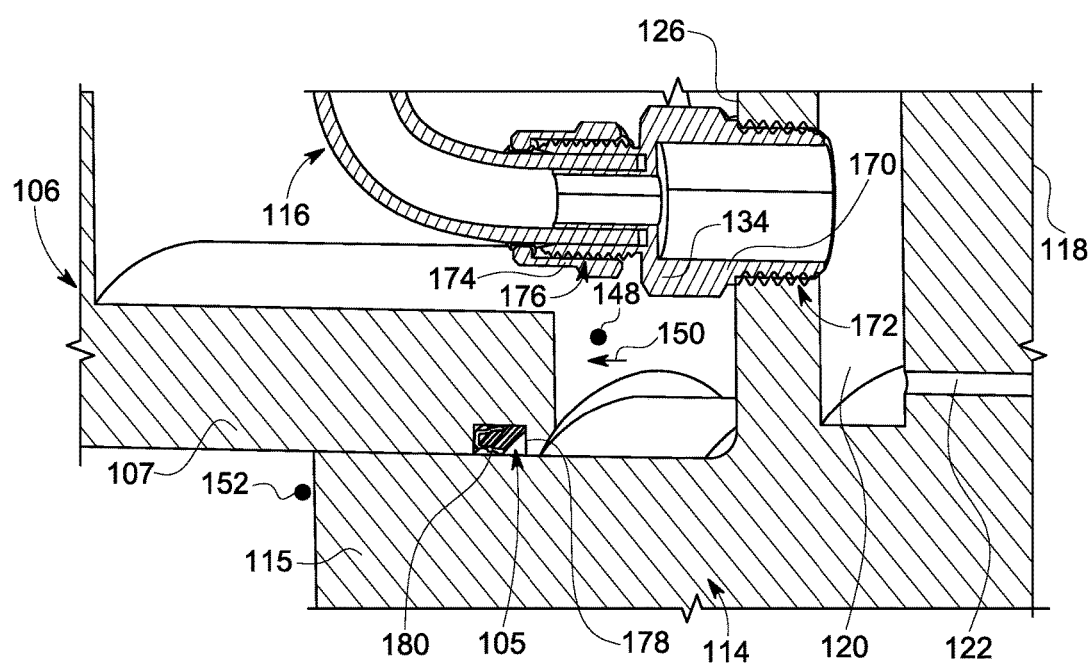
FIG. 14 is a schematic sectional view of a stator adaptor and at least one fluid supply tube coupled to a seal ring, in accordance with aspects of the present technique.

FIG. 14 shows a schematic view of a stator adaptor 106 and a fluid supply tube 116 coupled to a seal ring 114 in accordance with one exemplary embodiment of the present technique.

In the illustrated embodiment, the fluid supply tube 116 is coupled to a first pressure cavity 120 via a tube connector 134. In one embodiment, a first side 170 of the tube connector 134 is coupled to a second peripheral side 126 of the seal ring 114 via threaded elements 172 formed in the second peripheral side 126 and the tube connector 134. Similarly, a second side 174 of the tube connector 134 is coupled to the fluid supply tube 116 via threaded elements 176 formed in the fluid supply tube 116 and the tube connector 134.

The stator adaptor 106 includes a projected end portion 107 extending towards the seal bearing face 118 and a groove 178 formed in the projected end portion 107. The seal ring 114 includes a projected end portion 115 extending away from the seal bearing face 118. In one embodiment, the projected end portion 107 of the stator adaptor 106 and the groove 178 is configured to face the projected end portion 115 of the seal ring 114. The face seal assembly 102 further includes a secondary seal 180 disposed between the projected end portions 107, 115. Specifically, the secondary seal 180 is disposed within the groove 178 such that the secondary seal 180 is in contact with the projected end portions 107, 115. The secondary seal 180 may include a metallic or non-metallic material. In one embodiment, the secondary seal 180 is an O-ring. In certain embodiments, the secondary seal 180 is a C-seal and like. The secondary seal 180 is configured to regulate leakage of a process fluid 150 from a second pressure cavity 148 to a third pressure cavity 152 through the sliding interface defined between the stator adaptor 106 and the seal ring 114.

Figure 15:
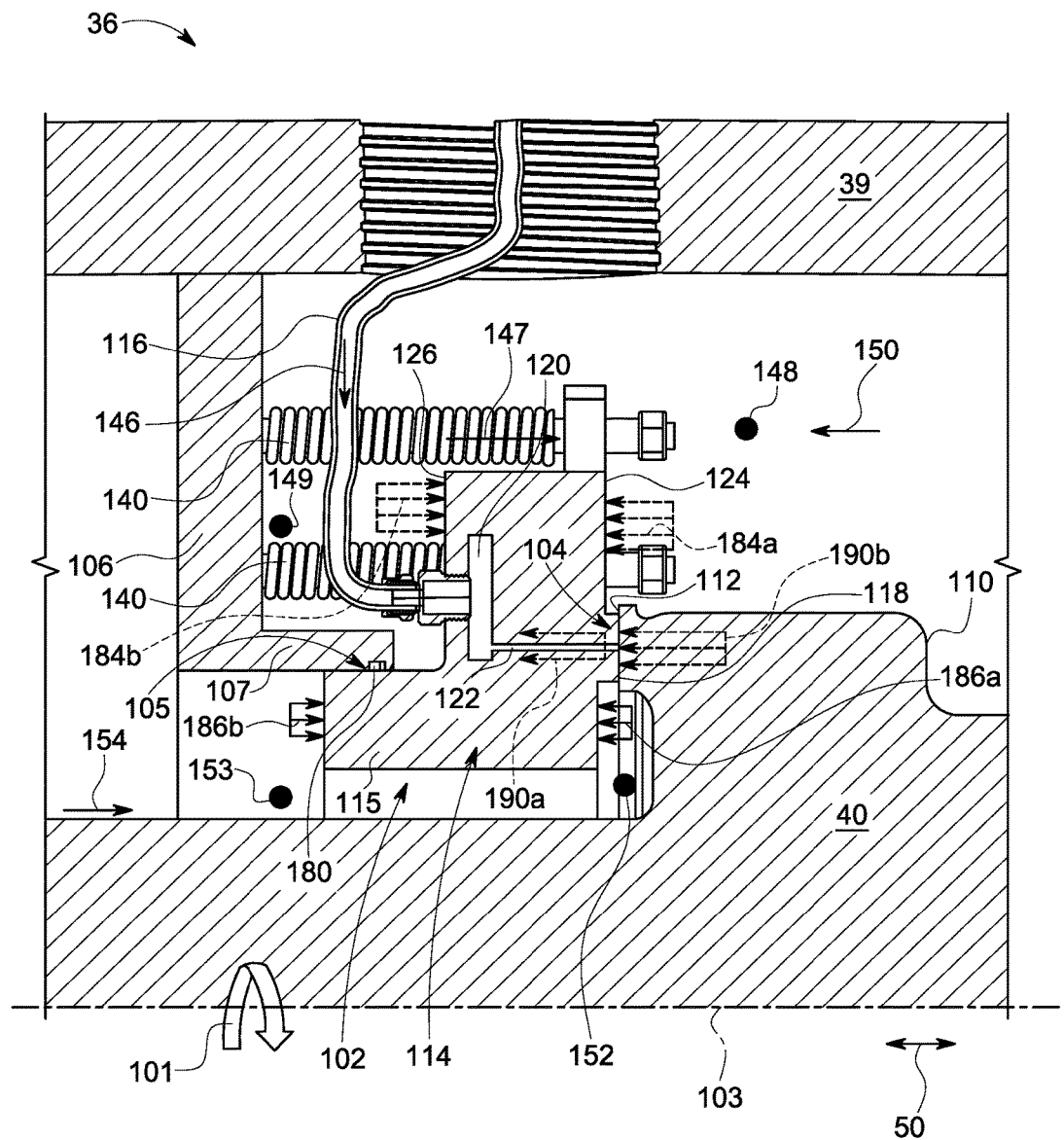
FIG. 15 is a schematic sectional view of a portion of a steam turbine, in accordance with aspects of the present technique.

FIG. 15 shows a schematic view of a portion of steam turbine 36 in accordance with one exemplary embodiment of the present technique. In one embodiment, the steam turbine 36 includes a stator 39, a rotor 40, and a face seal assembly 102 slidably coupled to the stator 39 and defines a primary seal clearance 104 there between a rotor bearing face 112 and a seal bearing face 118. The projected end portion 107 of the stator adaptor 106 is disposed proximate to the projected end portion 115 of the seal ring 114. The secondary seal 180 is disposed there between the stator adaptor 106 and the seal ring 114.

During stationary condition of the rotor 40, the seal bearing face 118 and the rotor bearing face 112 are in contact with each other. The plurality of biasing members 140 is configured to apply a closing force 147 to keep the seal ring 114 and the rotor ring 110 in contact with each other. In one or more embodiments, the process fluid 150 (i.e., a high-pressure fluid) in the second pressure cavity 148 applies a separating force 184a on the first peripheral side 124 of the seal ring 114 and the process fluid 150 in a fourth pressure cavity 149 applies a closing force 184b on the second peripheral side 126 of the seal ring 114. Similarly, the mixed fluid 154 (i.e., a low-pressure fluid) in the third pressure cavity 152 applies a separating force 186a on the first peripheral side 124 of the seal ring 114 and the mixed fluid 154 in a fifth pressure cavity 153 applies a closing force 186b on the second peripheral side 126 of the seal ring 114. In general, during the stationary condition, the sum of closing forces 147, 184b, 186b is larger than the sum of separating forces 184a, 186a, which results in maintaining the seal ring 114 and the rotor ring 110 in contact using the contact force equivalent to the imbalance between the closing and separating forces.

In one embodiment, the second and fourth pressure cavities 148, 149 are filled with a high-pressure process fluid 150 and the third and fifth pressure cavities 152, 153 are filled with a low-pressure mixed fluid 154. In such embodiments, a portion of the process fluid 150 leaks from the second pressure cavity 148 to the third pressure cavity 152 through the primary seal clearance 104 and/or the secondary seal clearance 105.

During operation of the face seal assembly 102, the plurality of isolated hydrostatic ports 122 injects a pressurized fluid 146 against the rotor bearing face 112 to generate a first separating force 190a for lifting-off the seal bearing face 118 and generate a fluid-film (not shown) there between the rotor bearing face 112 and the seal bearing face 118. Subsequently, the process fluid 150 at a second pressure is directed along the stator 39 and the rotor 40 and leaking a portion of the process fluid 150 from the second pressure cavity 148 to the third pressure cavity 152 through the face seal clearance 104. The rotor 40 is rotated, as shown by reference numeral 101, about an axis 103 of the steam turbine 36. The separating force 190a caused by the pressurized fluid 146 allows the sealing face 118 to remain separated from the rotor face 112 while the rotor 40 is rotating, thereby initiating the fluid-film riding operation of the face seal assembly 102.

In another embodiment, during operation of the face seal assembly 102 injects a pressurized fluid 146 against the rotor bearing face 112 to generate the first separating force 190a for lifting-off the seal bearing face 118 and generate a fluid-film (not shown) there between the rotor bearing face 112 and the seal bearing face 118. Subsequently, the process fluid 150 is directed along the stator 39 and the rotor 40 and a portion of the process fluid 150 is leaked from the second pressure cavity 148 to the third pressure cavity 152 through the face seal clearance 104. The rotor 40 is rotated about the axis 103 causing the portion of the process fluid 150 and the pressurized fluid 146 to rotate between the sealing faces 112, 118, thereby increasing the pressure of at least one of a portion of the pressurized fluid 146 and the process fluid 150 fluid along the face seal clearance 104 and altering one or more parameters of the fluid-film using the plurality of hydrodynamic elements. Specifically, the rotation of the rotor 40 may cause the plurality of hydrodynamic elements to generate the second separating force 190b for lifting-off the seal bearing face 118 further and continue the fluid-film riding operation of the face seal assembly 102. In such embodiments, the plurality of hydrodynamic elements may be disposed on one of the rotor bearing face 112 and the seal bearing face 118. In certain embodiments, the one or more parameters include a thickness of the fluid-film and a stiffness of the fluid-film.

In yet another embodiment, during operation of the face seal assembly 102, the process fluid 150 is directed along the stator 39 and the rotor 40 and a portion of the process fluid 150 is leaked from the second pressure cavity 148 to the third pressure cavity 152 through the face seal clearance 104. Further, the rotor 40 is rotated about the axis 103 of the steam turbine 36 causing the portion of the process fluid 150 and the pressurized fluid 146 to rotate in the primary seal clearance 104. In such an embodiment, upon rotation of the rotor 40, the plurality of hydrodynamic elements may generate the first separating force 190b for lifting-off the seal bearing face 118 and initiate the fluid-film riding operation of the face seal assembly 102. Subsequently, the pressurized fluid 146 is injected via the plurality of isolated hydrostatic ports 122 against the rotor bearing face 112 to generate the second separating force 190a for lifting-off the seal bearing face 118 further and continue the fluid-film riding operation of the face seal assembly 102. It should be noted herein that the terms "first separating force" and "second separating force" may be used interchangeably without deviating from the scope of the present technique.

In one or more embodiments, the fluid-film produced in the primary seal clearance 104 is configured to regulate a leakage flow of the process fluid 150 from the second pressure cavity 148 to the third pressure cavity 152. The secondary seal 180 is configured to regulate the leakage flow of the process fluid 150 from the fourth pressure cavity 149 to the fifth pressure cavity 153. In certain embodiments, the secondary seal 180 is further configured to provide a sliding interface between the stator adaptor 106 and the seal ring 114 such that the face seal assembly 102 may move only along the axial direction 50. The production of the fluid-film in the primary seal clearance 104 is discussed in greater details below.

Figure 16:
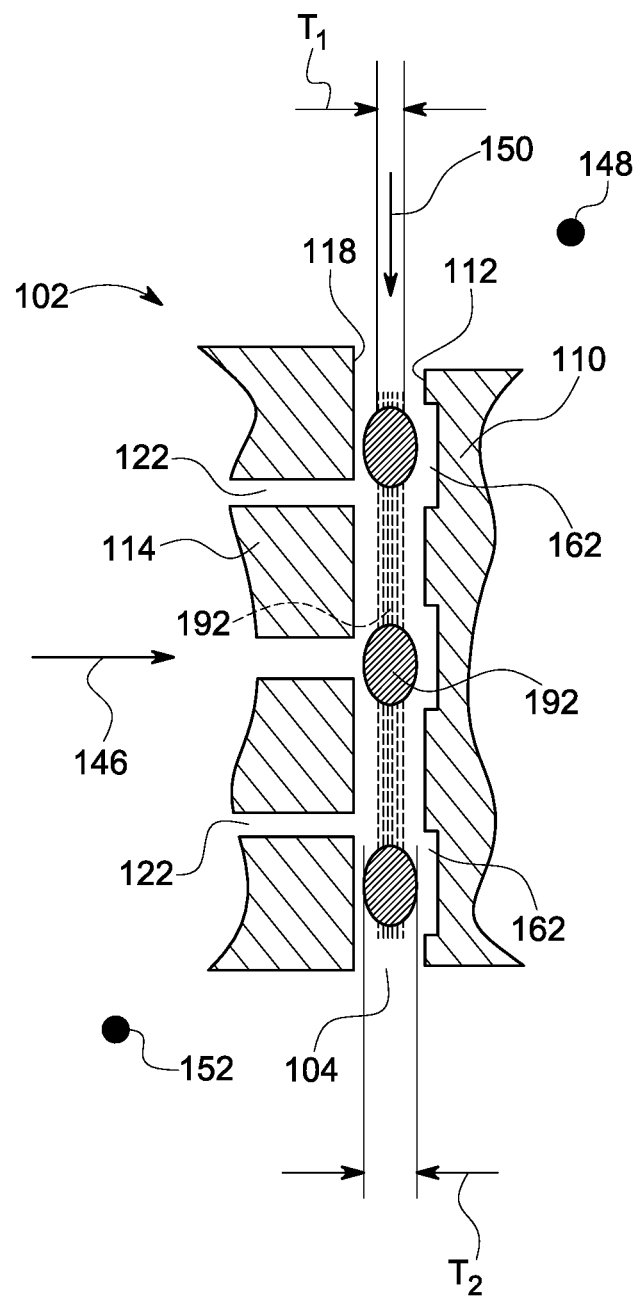
FIG. 16 is a cross-sectional view of a rotor ring and a seal ring, in accordance with aspects of the present technique.

FIG. 16 shows a cross-sectional view of a rotor ring 110 and a seal ring 114 in accordance with one exemplary embodiment of the present technique. During operation of the face seal assembly 102, the pressurized fluid 146 at a first pressure is injected through the plurality of isolated hydrostatic ports 122 against the rotor bearing face 112 to generate a first separating force between the rotor bearing face 112 and the seal bearing face 118, produce a fluid-film 192 along the face seal clearance 104, and prevent the seal bearing face 118 to contact the rotor bearing face 112 using the fluid-film 192. In such an embodiment, the first separating force generated by the pressurized fluid 146 is configured to lift-off the seal bearing face 118 and initiate the fluid-film 192 riding operation of the face seal assembly 102 upon injection of the pressurized fluid 146. The fluid-film 192 has a first thickness "$T_1$".

Further, the turbomachine is configured to direct the process fluid 150 at a second pressure along the stator and the rotor, and leak a portion of the process fluid 150 from the second pressure cavity 148 to the third pressure cavity 152 through the face seal clearance 104. Subsequently, the rotor is rotated causing a portion of the process fluid 150 and the portion of the pressurized fluid 146 to rotate in the primary seal clearance 104. The rotation of rotor results in increasing pressure of at least one of a portion of the pressurized fluid 146 and the portion of the process fluid 150 along the face seal clearance 104 for altering one or more parameters of the fluid-film 192 using the plurality of hydrodynamic elements. Specifically, upon rotation of the rotor 40, the plurality of hydrodynamic elements 162 is configured to generate a second separating force between the rotor bearing face 112 and the seal bearing face 118 and alter the one or more parameters, such as, thickness and stiffness of the fluid-film 192. The thickness of fluid-film 192 is increased from the first thickness "$T_1$" to a second thickness "$T_2$". In such embodiments, the second separating force generated by the plurality of hydrodynamic elements 162 further lift-off the seal bearing face 118 and continue the fluid-film 192 riding operation of the face seal assembly 102. In certain embodiments, the face seal assembly without the plurality of hydrodynamic elements 162 disposed on the rotor or seal bearing faces may continue to operate with the fluid-film thickness of "$T_1$."

It should be noted herein that in certain other embodiments where the hydrodynamic elements are present, during operation of the face seal assembly 102, the rotor may be configured to rotate first to generate the first separating force between the rotor bearing face 112 and the seal bearing face 118, lift-off the seal bearing face 118, produce the fluid-film 192 along the face seal clearance 104, and initiate the fluid-film 192 riding operation of the face seal assembly 102. Subsequently, the plurality of isolated hydrostatic ports 122 may be configured to inject the pressurized fluid 146 against the rotor bearing face 112 to generate the second separating force between the rotor bearing face 112 and the seal bearing face 118 and increase thickness and stiffness of the fluid-film 192. Specifically, the pressurized fluid 146 is configured to further lift-off the seal bearing face 118 and continue the fluid-film 192 riding operation of the face seal assembly 102.

In one or more embodiments, the fluid-film 192 prevents the seal bearing face 118 to contact the rotor bearing face 112. Further, the fluid-film 192 regulates a leakage flow of the process fluid 150 from the second pressure cavity 148 to the third pressure cavity 152 through the face seal clearance 104. In certain embodiments, the fluid-film riding operation of the face seal assembly generates a windage heat along the along the seal bearing face 118 and the rotor bearing face 112. In such embodiments, injecting the pressurized fluid 146 further includes cooling the face seal assembly 102 to reduce the heat generated by the fluid-film 192 along the seal bearing face 118 and the rotor bearing face 112.

In one or more embodiments, a flow of the pressurized fluid 146 through the plurality of isolated hydrostatic ports 122 is regulated to control at least one the face seal clearance 104, the separating force (i.e., the first separating force 190a, as shown in FIG. 15) generated between the seal bearing face 118 and the rotor bearing face 112, and the thickness of the fluid-film 192. In certain embodiments, injecting the pressurized fluid includes feeding the pressurized fluid 146 at a pressure that is substantially greater than a pressure of the process fluid 150 in the second pressure cavity 148 to prevent a flow of the process fluid 150 from the face seal clearance 104 to the fluid supply tube 116 (as shown in FIG. 15) via the plurality of isolated hydrostatic ports 122.

The plurality of isolated hydrostatic ports 122 is used for injecting the pressurized fluid 146, during start-up condition to generate the separating force which is adequate to lift-off the seal bearing face 118 and thereby produce the thin fluid-film 192. The rotor 40 may then rotate from the stationary condition without damaging the seal and rotor bearing faces 118, 112, which are in contact with each other during stationary condition. With increasing speed of the rotor 40, the hydrodynamic elements 162 may further aid the lift-off generated by the isolated hydrostatic ports 122 and produce a relatively thick and stiff fluid-film 192 there between the seal and rotor bearing faces 118, 112.

Figure 17:
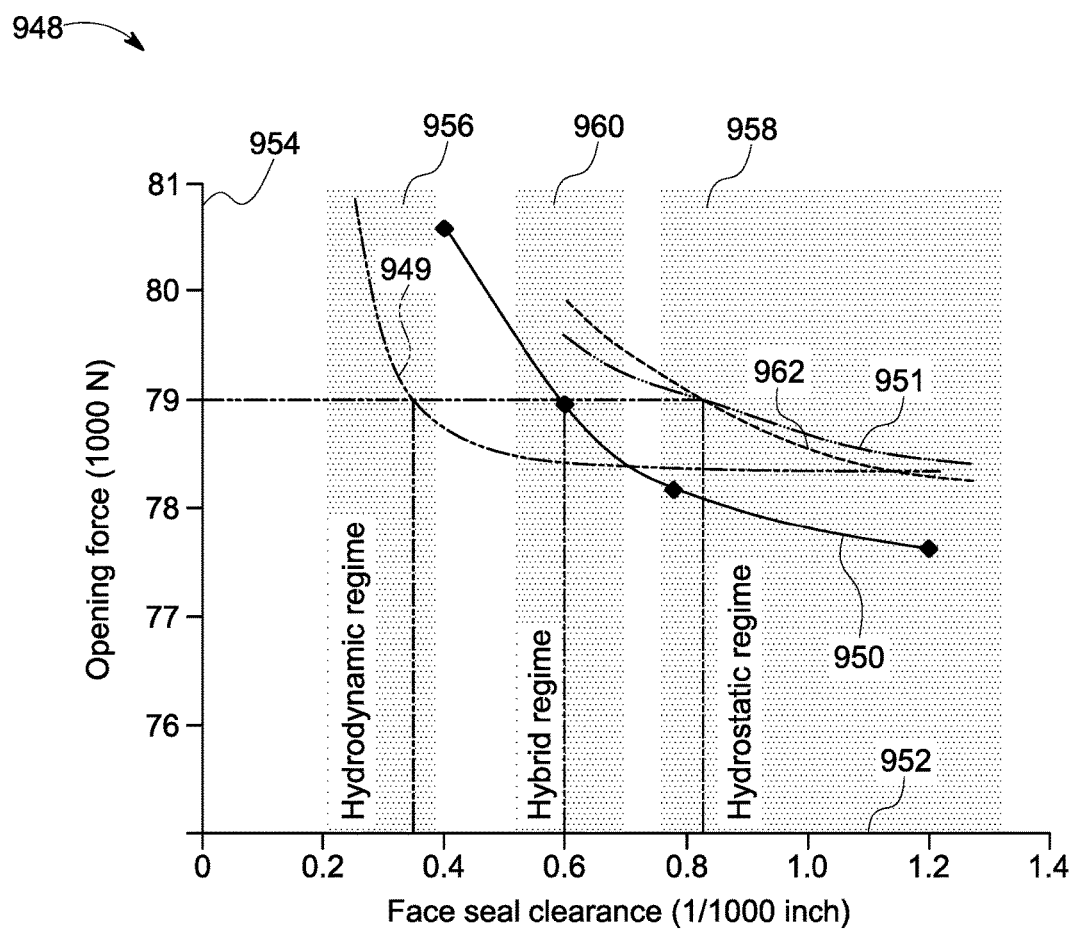
FIG. 17 is a graph illustrating a characteristic curve of a fluid-film thickness, in accordance with aspects of the present technique.

FIG. 17 shows a graph 948 illustrating characteristic curves 949, 950, 951, 962 of a fluid-film thickness in accordance with one exemplary embodiment of the present technique. In the illustrated embodiment, the fluid-film thickness or the face seal clearance 952 is plotted along an x-axis and a separating force 954 is plotted along a y-axis. It should be noted herein that the values shown along the x-axis and y-axis relate to one embodiment of the face seal assembly with representative pressures and dimensions. It is understood that these values may change depending on the cross-sectional dimensions (i.e., diameter, radial height of the seal bearing face and like) and the fluid pressures (upstream pressure, downstream pressure and supply pressure) of the face seal assembly. While such changes may quantitatively affect the values shown in the graph 948, the qualitative characteristics of the graph 948 may remain the same.

The characteristic curve 949 corresponds to a hydrodynamic face seal assembly operating in a thin fluid-film hydrodynamic regime 956. Such a hydrodynamic face seal assembly generates about 79000 N of separating force for a face seal clearance of about 0.00035 inch. In such an embodiment, the hydrodynamic face seal has a thin fluid-film thickness and a very high stiffness. However, the hydrodynamic face seal has a high risk of rubbing a seal bearing face against a rotor bearing face. Similarly, the characteristic curve 951 corresponds to a traditional orifice-compensated hydrostatic port seal operating in a thick fluid-film hydrostatic regime 958. Such a hydrostatic port seal generates about 79000 N of separating force for the face seal clearance of about 0.00082 inch. In such embodiments, the traditional orifice-compensated hydrostatic port seal has a relatively thick fluid-film thickness and a low stiffness. However, such a hydrostatic port seal has a less risk of rubbing the seal bearing face against the rotor bearing face.

Two additional characteristic curves 950, 962 shown in FIG. 17 relate to characteristics of the face seal assembly technique described herein. Specifically, the characteristic curve 962 corresponds to a hydrostatic seal with a pressurized fluid injected through a plurality of isolated hydrostatic ports (i.e., a face seal assembly described in FIG. 2). Such a hydrostatic seal generates a separating force of 79000 N for a face seal clearance 0.00082 inch. An important difference between the characteristic curve 962 and the characteristic curve 951 is the higher fluid-film stiffness associated with characteristic curve 962 as is evident from the steeper gradient of the characteristic curve 962. In other words, the face seal assembly of the present technique operating in a hydrostatic mode may have a relatively higher fluid-film stiffness than a traditional orifice-compensated hydrostatic seal. Note that the higher fluid-film stiffness of characteristic curve 962 compared to characteristic curve 951 is due to the "$P_{supply}$" being higher than "$P_{high}$" as explained in FIG. 8. The characteristic curve 950 corresponds to a hybrid face seal assembly (i.e., a face seal assembly 102, as discussed in the embodiment of FIG. 2 along with the plurality of hydrodynamic elements shown in FIG. 11-13) operating in a relatively thick fluid-film hybrid regime 960. Such a hybrid face seal assembly generates about 79000 N of separating force for the face seal clearance of about 0.0006 inch. In such embodiments, the hybrid face seal has a relatively thick fluid-film (compared to a pure hydrodynamic seal characteristic curve 949) and a high stiffness (compared to the hydrostatic seal characteristic curves 951, 962). It should be noted herein that in one or more embodiments, the hybrid face seal assembly refers to a face seal assembly including the combination of a plurality of hydrodynamic elements and a plurality of isolated hydrostatic ports, as described in the embodiments of FIGS. 2-16. Thus, for the same separating force of 79,000N, the hybrid face seal not only has a less risk of rubbing the seal bearing face against the rotor bearing face due to its increased film thickness compared to the hydrodynamic face seal, but also has better film stiffness than the hydrostatic port seal or the hydrodynamic face seal at such large film thickness of 0.0006 inch. It should be noted herein that the term "stiffness" of the fluid film is a slope (i.e., a gradient) in the characteristic curves 949, 950, 951 or 962 for the separating force 954 versus the fluid-film thickness 952.

Advantageously, in accordance with one or more embodiments discussed herein, the plurality of isolated hydrostatic ports and the plurality of hydrodynamic elements allows the face seal assembly to be operated with a relatively thick fluid-film which otherwise is not possible with the traditional face seal assembly operating with only the hydrodynamic face seal or the hydrostatic port seal. Further in accordance with one or more embodiments discussed herein, the plurality of isolated hydrostatic ports allows the face seal assembly to be operated with a relatively high fluid-film stiffness which otherwise is not possible with the traditional orifice-compensated hydrostatic port seal. Further, the face seal assembly improves stiffness of the fluid-film, which is less sensitive to rotational speeds, deformations of the sealing faces, and angular misalignments of the rotor. The face seal assembly operating with relatively thick fluid-film allows to use the sealing faces with low degree of flatness and assembly tolerances. Further, the face seal assembly may be operated with the seal ring or the rotor ring having relatively larger diameter, thereby reducing the cost of machining sealing faces.

While only certain features of embodiments have been illustrated and described herein, many modifications and changes will occur to those skilled in the art. It is, therefore, to be understood that the appended claims are intended to cover all such modifications and changes as falling within the spirit of the technique.

The invention claimed is:

1. A turbomachine comprising:
a stator;
a rotor comprising a rotor bearing face;
a face seal assembly comprising a seal ring comprising a seal bearing face, a first pressure cavity, and a plurality of isolated hydrostatic ports extending from the first pressure cavity to the seal bearing face and wherein the face seal assembly is slidably coupled to the stator and defines a face seal clearance between the rotor bearing face and the seal bearing face; and
a second pressure cavity and a third pressure cavity defined by the stator, the rotor, and the face seal assembly, wherein the third pressure cavity is disposed downstream of the second pressure cavity with reference to a flow of a process fluid along the stator and the rotor, and wherein the first pressure cavity is isolated from the second and third pressure cavities.

2. The turbomachine of claim 1, further comprising:
a fluid supply tube coupled to the first pressure cavity;
a pressure-control device coupled to the fluid supply tube; and
a control unit coupled to a pressure-control device and configured to control the pressure-control device.

3. The turbomachine of claim 2, wherein the pressure-control device comprises a pump or a control valve.

4. The turbomachine of claim 1, further comprising a fluid supply tube coupled to the first pressure cavity and at least one stage of a plurality of stages of the turbomachine, wherein the fluid supply tube is configured to supply a pressurized fluid from the at least one stage to the first pressure cavity.

5. The turbomachine of claim 1, wherein one or more isolated hydrostatic port of the plurality of isolated hydrostatic ports comprises a first portion having a first diameter and a second portion having a second diameter different from the first diameter.

6. The turbomachine of claim 5, wherein the first diameter of the first portion and the second diameter of the second portion of the isolated hydrostatic port of the plurality of isolated hydrostatic ports are different from the first diameter of the first portion and the second diameter of the second portion of an adjacent isolated hydrostatic port of the plurality of isolated hydrostatic ports.

7. The turbomachine of claim 1, wherein the plurality of isolated hydrostatic ports is disposed spaced apart from each along a circumferential direction of the turbomachine and at a central-line axis of the seal bearing face.

8. The turbomachine of claim 1, wherein the plurality of isolated hydrostatic ports is disposed spaced apart from each other along a circumferential direction of the turbomachine and radially offset from a central-line axis of the seal bearing face.

9. The turbomachine of claim 1, wherein one of the rotor bearing face and the seal bearing face comprises a plurality of hydrodynamic elements disposed spaced apart from each other along a circumferential direction of the turbomachine.

10. The turbomachine of claim 9, wherein the plurality of hydrodynamic elements comprises at least one spiral groove.

11. The turbomachine of claim 9, wherein the plurality of hydrodynamic elements comprises at least one Rayleigh step.

12. The turbomachine of claim 1, wherein the seal ring comprises a segmented seal ring.

13. A method comprising:
injecting a pressurized fluid at a first pressure against a rotor bearing face of a rotor through a plurality of isolated hydrostatic ports of a face seal assembly to generate a fluid-film between the rotor and the face seal assembly, wherein the face seal assembly comprises:
a seal ring comprising a seal bearing face, a first pressure cavity, and the plurality of isolated hydrostatic ports extending from the first pressure cavity to the seal bearing face, and wherein the face seal assembly is slidably coupled to a stator and defines a face seal clearance between the rotor bearing face and the seal bearing face;
directing a process fluid at a second pressure along the stator and the rotor, and leaking a portion of the process fluid from a second pressure cavity to a third pressure cavity through the face seal clearance, wherein the second and third pressure cavities are defined by the stator, the rotor, and the face seal assembly, wherein the first pressure cavity is isolated from the second and third pressure cavities, and wherein the first pressure is greater than the second pressure; and
rotating the rotor for a fluid-film riding operation of the face seal assembly.

14. A method of claim 13, wherein rotating the rotor further comprises altering one or more parameters of the fluid-film using a plurality of hydrodynamic elements disposed on one of the rotor bearing face and the seal bearing face and spaced apart from each other along a circumferential direction of a turbomachine.

15. The method of claim 14, wherein the one or more parameters comprises a thickness of the fluid-film and a stiffness of the fluid-film.

16. The method of claim 14, wherein rotating the rotor further comprises generating a separating force to lift-off the seal bearing face and initiate or continue the fluid-film riding operation of the face seal assembly using the plurality of hydrodynamic elements, and wherein the seal bearing face and the rotor bearing face are in contact with each other during a stationary condition of the rotor.

17. The method of claim 13, wherein injecting the pressurized fluid further comprises generating a separating force to lift-off the seal bearing face and initiate the fluid-film riding operation of the face seal assembly, and wherein the seal bearing face and the rotor bearing face are in contact with each other during a stationary condition of the rotor.

18. The method of claim 13, further comprising regulating the first pressure of the pressurized fluid for controlling at least one of a separating force generated between the seal bearing face and the rotor bearing face, a thickness of the face seal clearance, and a misalignment of the rotor.

19. The method of claim 18, wherein regulating the first pressure of the pressurized fluid comprises controlling a pressure-control device coupled to a fluid supply tube via a control unit, wherein the fluid supply tube is coupled to the first pressure cavity, and wherein the pressure-control device comprises a fluid pump or a control valve or a compressor.

20. The method of claim 18, wherein regulating the first pressure of the pressurized fluid comprises controlling a flow of the pressurized fluid through a plurality of isolated hydrostatic ports comprising a first portion having a first diameter and a second portion having a second diameter different from the first diameter.

21. The method of claim 18, wherein regulating the first pressure of the pressurized fluid comprises controlling a flow of the pressurized fluid through the plurality of isolated hydrostatic ports disposed spaced apart from each other along a circumferential direction of a turbomachine and at a central line axis of the seal bearing face.

22. The method of claim 18, wherein regulating the first pressure of the pressurized fluid comprises controlling a flow of the pressurized fluid through the plurality of isolated hydrostatic ports disposed spaced apart from each other along a circumferential direction of a turbomachine and radially offset from a central line axis of the seal bearing face.

\* \* \* \* \*